US011209314B2

(12) United States Patent
Fleisher et al.

(10) Patent No.: US 11,209,314 B2
(45) Date of Patent: Dec. 28, 2021

(54) CAVITY BUILDUP DISPERSION SPECTROMETER AND PERFORMING CAVITY BUILDUP DISPERSION SPECTROSCOPY

(71) Applicant: Government of the United States of America, as represented by the Secretary of Commerce, Gaithersburg, MD (US)

(72) Inventors: Adam Joseph Fleisher, Gaithersburg, MD (US); Keith Alan Gillis, Washington Grove, MD (US); Joseph Terence Hodges, Washington Grove, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

(21) Appl. No.: 17/126,118

(22) Filed: Dec. 18, 2020

(65) Prior Publication Data
US 2021/0190589 A1 Jun. 24, 2021

Related U.S. Application Data

(60) Provisional application No. 62/951,200, filed on Dec. 20, 2019.

(51) Int. Cl.
*G01N 21/00* (2006.01)
*G01J 3/433* (2006.01)
(Continued)

(52) U.S. Cl.
CPC ............ *G01J 3/4338* (2013.01); *G01J 3/021* (2013.01); *G01J 3/0232* (2013.01); *G01J 3/10* (2013.01); *G01J 3/12* (2013.01)

(58) Field of Classification Search
CPC . G01N 21/00; G01N 21/17; G01J 3/02; G01J 3/4338; G01J 3/12; G01J 3/10; G01J 3/021; G01J 3/0232
See application file for complete search history.

(56) References Cited

U.S. PATENT DOCUMENTS 6,094,267 A 7/2000 Levenson et al.
6,727,492 B1 4/2004 Ye et al.
(Continued)

OTHER PUBLICATIONS

Cygan, A., et al., "Cavity buildup dispersion spectroscopy", Magazine Title, 2020.
(Continued)

*Primary Examiner* — Abdullahi Nur
(74) *Attorney, Agent, or Firm* — Office of Chief Counsel for National Institute of Standards and Technology

(57) ABSTRACT

A cavity buildup dispersion spectrometer includes a shutter that modulates coherent electromagnetic radiation at a shutter frequency; and produces modulated electromagnetic radiation; a frequency shifter that frequency shifts the modulated electromagnetic radiation to a shifter frequency and produces frequency shifted radiation; a resonator that produces cavity radiation from the frequency shifted radiation and the coherent electromagnetic radiation, receives an analyte; subjects the analyte to cavity radiation, and transmits the cavity radiation as transmitted electromagnetic radiation; and a receiver that: produces a detector signal from the transmitted electromagnetic radiation, such that the detector signal includes a beat frequency that corresponds to a change in a motion of resonator that includes a change in
(Continued)

the distance between the mirrors or a change of refractive index of the analyte in the intracavity space.

16 Claims, 12 Drawing Sheets

(51) Int. Cl.
  *G01J 3/12* (2006.01)
  *G01J 3/10* (2006.01)
  *G01J 3/02* (2006.01)

(56) References Cited

U.S. PATENT DOCUMENTS

| | | |
|---|---|---|
| 7,012,696 B2 | 3/2006 | Orr et al. |
| 8,642,982 B2 | 2/2014 | Plusquellic et al. |
| 2017/0269389 A1* | 9/2017 | Kie Ling .............. G02F 1/3501 |

OTHER PUBLICATIONS

Cygan, A., et al., "One-dimensional frequency-based spectroscopy", Optics Express, 2015, p. 14472-14486, vol. 23 No. 11.

He, Y., et al., "Rapidly swept, continuous-wave cavity ringdown spectroscopy with optical heterodyne detection: single- and multi-wavelength sensing of gases", Applied Physics B, 2002, p. 267-280, vol. 75.

He, Y, et al., "Optical heterodyne signal generation and detection in cavity ringdown spectroscopy based on a rapidly swept cavity", Chemical Physics Letters, 2001, p. 215-220, vol. 335.

Lehmann, K., et al., "The superposition principle and cavity ringdown spectroscopy", The Journal of Chemical Physics, 1996, p. 10263-10277, vol. 105 No. 23.

Levenson, M.D., et al., "Optical heterodyne detection in cavity ring-down spectroscopy", Chemical Physics Letters, 1998, p. 335-340, vol. 290.

Long, D.A., et al., "Quantum-noise-limited cavity ring-down spectroscopy", Applied Physics B, 2014, p. 149-153, vol. 115.

Rosenblum, S., et al., "Cavity ring-up spectroscopy for ultrafast sensing with optical microresonators", Nature Comunications, 2015, p. 6788, vol. 6.

Truong, G-W., et al., "Frequency-agile, rapid scanning spectroscopy", Nature Communications, 2013, p. 532-534, vol. 7.

Wójtewicz, S., et al., "Response of an optical cavity to phase-controlled incomplete power switching of nearly resonant incident light", Optics Express, 2018, p. 5644-5654, vol. 26 No. 5.

Ye, M-E., et al., "Theory of cavity ring-up spectroscopy", Optics Express, 2017, p. 3295-32400, vol. 25 No. 26.

Ye, J., et al., "Cavity ringdown heterodyne spectroscopy: High sensitivity with microwatt light power", Physical Review A, 2000, p. 061802, vol. 61.

* cited by examiner

CAVITY BUILDUP DISPERSION SPECTROMETER AND PERFORMING CAVITY BUILDUP DISPERSION SPECTROSCOPY

CROSS REFERENCE TO RELATED APPLICATIONS

The application claims priority to U.S. Provisional Patent Application Ser. No. 62/951,200 filed Dec. 20, 2019, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 975-2573; email tpo@nist.gov; reference NIST Docket Number 19-012US1.

BRIEF DESCRIPTION

Disclosed is a cavity buildup dispersion spectrometer comprising: a shutter that receives coherent electromagnetic radiation, modulates the coherent electromagnetic radiation at a shutter frequency; and produces modulated electromagnetic radiation from the coherent electromagnetic radiation; a frequency shifter in communication with the shutter and that receives the modulated electromagnetic radiation from the shutter, frequency shifts the modulated electromagnetic radiation from the shutter frequency to a shifter frequency; and produces frequency shifted radiation having the shifter frequency from the modulated electromagnetic radiation; a resonator in communication with the frequency shifter and comprising: a plurality of mirrors separated by a distance; an intracavity space interposed between the mirrors having the distance as a length; and a plurality of cavity modes comprising: a primary cavity mode at a primary resonance frequency; and a secondary cavity mode at a secondary resonance frequency, such that the resonator: receives the frequency shifted radiation from the frequency shifter; receives coherent electromagnetic radiation; produces cavity radiation, in the intracavity space, from the frequency shifted radiation and the coherent electromagnetic radiation; receives an analyte in the intracavity space; subjects the analyte to the cavity radiation transmits the cavity radiation as transmitted electromagnetic radiation; and a receiver in communication with the resonator and that: receives the transmitted electromagnetic radiation from the resonator; and produces detector signal from the transmitted electromagnetic radiation, such that the detector signal comprises a beat frequency that corresponds to a change in a motion of resonator that comprises a change in the distance between the mirrors or a change of refractive index of the analyte in the intracavity space.

Disclosed is a process for performing cavity buildup dispersion spectroscopy with a cavity buildup dispersion spectrometer, the process comprising: receiving, by a shutter, coherent electromagnetic radiation; modulating, by the shutter, the coherent electromagnetic radiation at a shutter frequency; producing, by the shutter, modulated electromagnetic radiation from the coherent electromagnetic radiation; a frequency shifter in communication with the shutter and that receiving, by a frequency shifter, the modulated electromagnetic radiation from the shutter; frequency shifting, by the frequency shifter, the modulated electromagnetic radiation from the shutter frequency to a shifter frequency; producing, by the frequency shifter, frequency shifted radiation having the shifter frequency from the modulated electromagnetic radiation; receiving, by a resonator, the frequency shifted radiation from the frequency shifter, the resonator comprising: a plurality of mirrors separated by a distance; an intracavity space interposed between the mirrors having the distance as a length; and a plurality of cavity modes comprising: a primary cavity mode at a primary resonance frequency; and a secondary cavity mode at a secondary resonance frequency, such that the resonator; receiving, by the resonator, coherent electromagnetic radiation; producing, by the resonator, cavity radiation, in the intracavity space, from the frequency shifted radiation and the coherent electromagnetic radiation; receiving, by the resonator, an analyte in the intracavity space; subjecting the analyte to the cavity radiation transmitting the cavity radiation as transmitted electromagnetic radiation from the resonator; receiving, by a receiver, the transmitted electromagnetic radiation from the resonator; and producing, by the receiver, a detector signal from the transmitted electromagnetic radiation to perform cavity buildup dispersion spectroscopy, wherein the detector signal comprises a beat frequency that corresponds to a change in a motion of resonator that comprises a change in the distance between the mirrors or a change of refractive index of the analyte in the intracavity space.

BRIEF DESCRIPTION OF THE DRAWINGS

The following description should not be considered limiting in any way. With reference to the accompanying drawings, like elements are numbered alike.

DETAILED DESCRIPTION

A detailed description of one or more embodiments is presented herein by way of exemplification and not limitation.

It has been discovered that a cavity buildup dispersion spectrometer provides high-precision optical measurements of a complex refractive index, wherein laser light attenuation and optical phase shifts attributable to an analyte are simultaneously encoded in transient light intensity exiting an optical resonator containing the analyte, e.g., in an effective transient oscillating optical heterodyne beat signal. Encoding of the instantaneous analyte complex refractive index into transmitted intensity overcomes technical deficiencies of conventional devices. The cavity buildup dispersion spectrometer and process described herein can include a frequency-agile laser system, high finesse optical resonator, and models for signal extraction from time-domain waveforms. The cavity buildup dispersion spectrometer and process can be used for physical sensing or determining length displacement.

Figure 1:
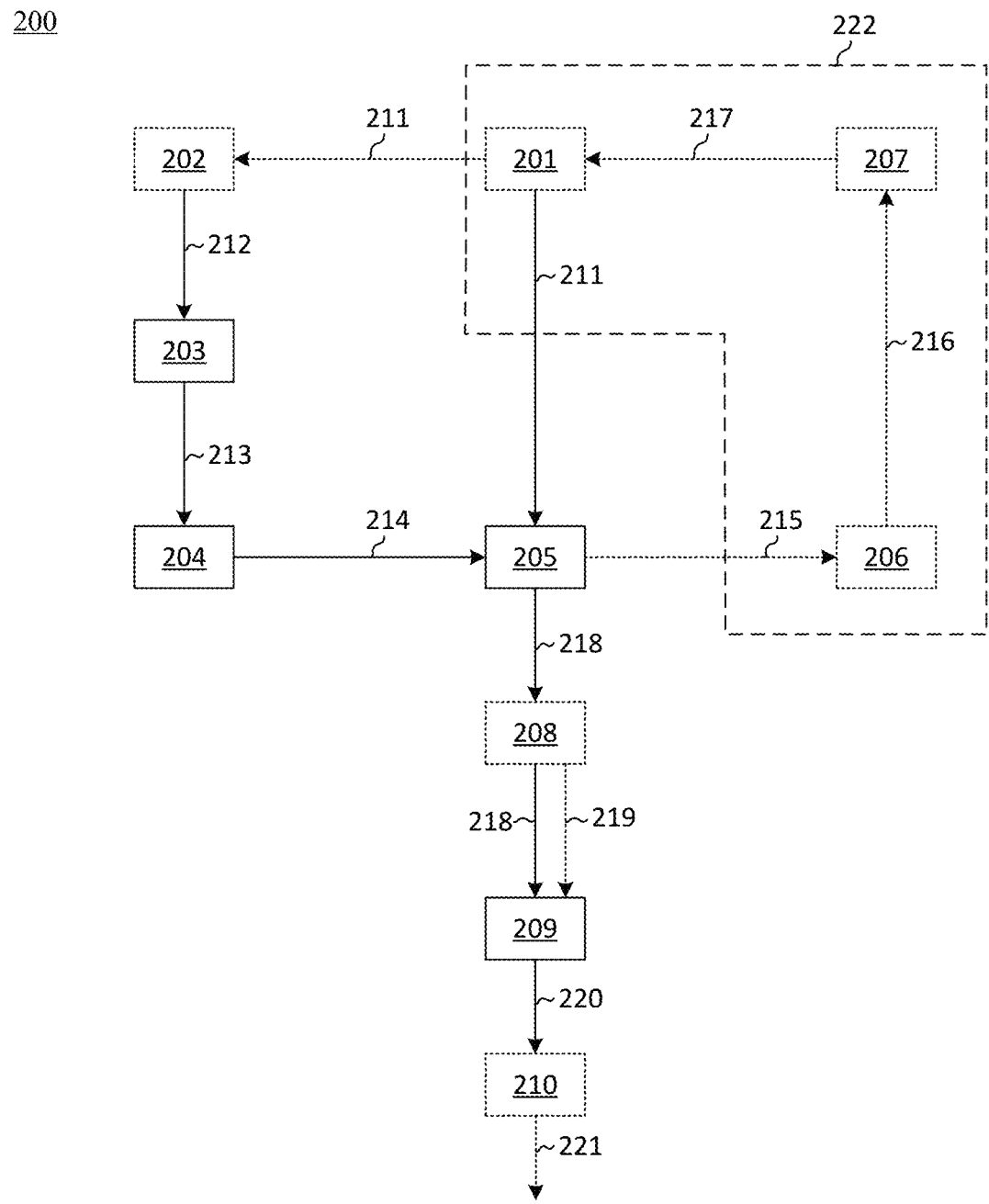
FIG. 1 shows a cavity buildup dispersion spectrometer.
Figure 2:
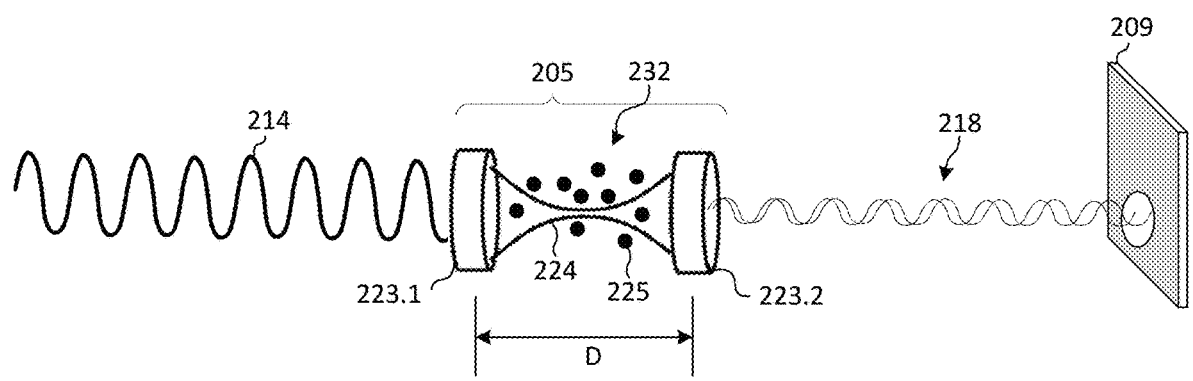
FIG. 2 shows a cavity buildup dispersion spectrometer.

Cavity buildup dispersion spectrometer 200 performs cavity buildup dispersion spectroscopy. In an embodiment, with reference to FIG. 1, FIG. 2, and FIG. 3, cavity buildup dispersion spectrometer 200 includes: shutter 203 that receives coherent electromagnetic radiation 212, modulates coherent electromagnetic radiation 212 at shutter frequency; and produces modulated electromagnetic radiation 213 from coherent electromagnetic radiation 212; frequency shifter 204 in communication with shutter 203 and that receives modulated electromagnetic radiation 213 from shutter 203, frequency shifts modulated electromagnetic radiation 213 from shutter frequency to shifter frequency; and produces frequency shifted radiation 214 having shifter frequency from modulated electromagnetic radiation 213; resonator 205 in communication with frequency shifter 204 and including: a plurality of mirrors 223 separated by a distance D; intracavity space 232 interposed between mirrors 223 having the distance as a length; and a plurality of cavity modes including: primary cavity mode 229 at primary resonance frequency 226; and secondary cavity mode 230 at secondary resonance frequency 233, such that resonator 205: receives frequency shifted radiation 214 from frequency shifter 204; receives coherent electromagnetic radiation 211; produces cavity radiation 224, in intracavity space 232, from frequency shifted radiation 214 and coherent electromagnetic radiation 211; receives analyte 225 in intracavity space 232; subjects analyte 225 to cavity radiation 224 transmits cavity radiation 224 as transmitted electromagnetic radiation 218; and receiver 209 in communication with resonator 205 and that: receives transmitted electromagnetic radiation 218 from resonator 205; and produces detector signal 220 from transmitted electromagnetic radiation 218, such that detector signal 220 includes beat frequency 231 that corresponds to a change in a motion of resonator 205 that includes a change in the distance between the mirrors or a change of refractive index of analyte 225 in intracavity space 232.

In an embodiment, cavity buildup dispersion spectrometer 200 further includes frequency locking loop 222 in communication with resonator 205 and second coherent electromagnetic source 202 and that: receives second coherent radiation 215 from resonator 205; produces coherent electromagnetic radiation 211 from second coherent radiation 215; and communicates coherent electromagnetic radiation 211 to second coherent electromagnetic source 202.

In an embodiment. resonator 205 produces second coherent radiation 215 from cavity radiation 224, and resonator 205 communicates second coherent radiation 215 to frequency locking loop 222.

In an embodiment, frequency locking loop 222 includes: receiver 206 in communication with resonator 205 and receives second coherent radiation 215 from resonator 205 and produces electronic error signal 216 from second coherent radiation 215; loop filter 207 in communication with receiver 206 and that receives electronic error signal 216 from receiver 206 and produces feedback control signal 217 from electronic error signal 216; and electromagnetic source 201 in communication with loop filter 207 and that: receives feedback control signal 217 from loop filter 207, produces coherent electromagnetic radiation 211 from feedback control signal 217, and communicates coherent electromagnetic radiation 211 to second coherent electromagnetic source 202 and resonator 205.

In an embodiment, cavity buildup dispersion spectrometer 200 includes second coherent electromagnetic source 202 in communication with shutter 203 and electromagnetic source 201 of frequency locking loop 222 and that: receives coherent electromagnetic radiation 211 from electromagnetic source 201; produces coherent electromagnetic radiation 212 from coherent electromagnetic radiation 211; and communicates coherent electromagnetic radiation 212 to frequency locking loop 222.

In an embodiment, resonator 205 receives coherent electromagnetic radiation 211 from electromagnetic source 201.

In an embodiment, cavity buildup dispersion spectrometer 200 includes discriminator 208 in communication with resonator 205 and receiver 209 and that: receives transmitted electromagnetic radiation 218 from resonator 205; produces discriminator signal 219 from transmitted electromagnetic radiation 218; and communicates discriminator signal 219 to receiver 209, such that receiver 209 produces detector signal 220 from discriminator signal 219.

In an embodiment, cavity buildup dispersion spectrometer 200 includes analyzer 210 in communication with receiver 209 and that: receives detector signal 220 from receiver 209; and produces analyzer signal 221 from detector signal 220.

Electromagnetic source 201 provides coherent electromagnetic radiation 211 and can include a laser such as a solid state laser. Coherent electromagnetic radiation 211 can be optical radiation (e.g., ultraviolet light, visible light, infrared light, and the like) or radiofrequency radiation such as microwave radiation.

Second coherent electromagnetic source 202 receives coherent electromagnetic radiation 211 from electromagnetic source 201 and produces coherent electromagnetic radiation 212 from coherent electromagnetic radiation 211. Second coherent electromagnetic source 202 can include a laser such as a solid state laser. Coherent electromagnetic radiation 212 can be optical radiation (e.g., ultraviolet light, visible light, infrared light, and the like) or radiofrequency radiation such as microwave radiation. It is contemplated that second coherent electromagnetic source 202 is frequency locked to electromagnetic source 201 so that a frequency (e.g., an optical frequency or microwave frequency) of coherent electromagnetic radiation 212 matches a frequency of coherent electromagnetic radiation 211.

Figure 4:
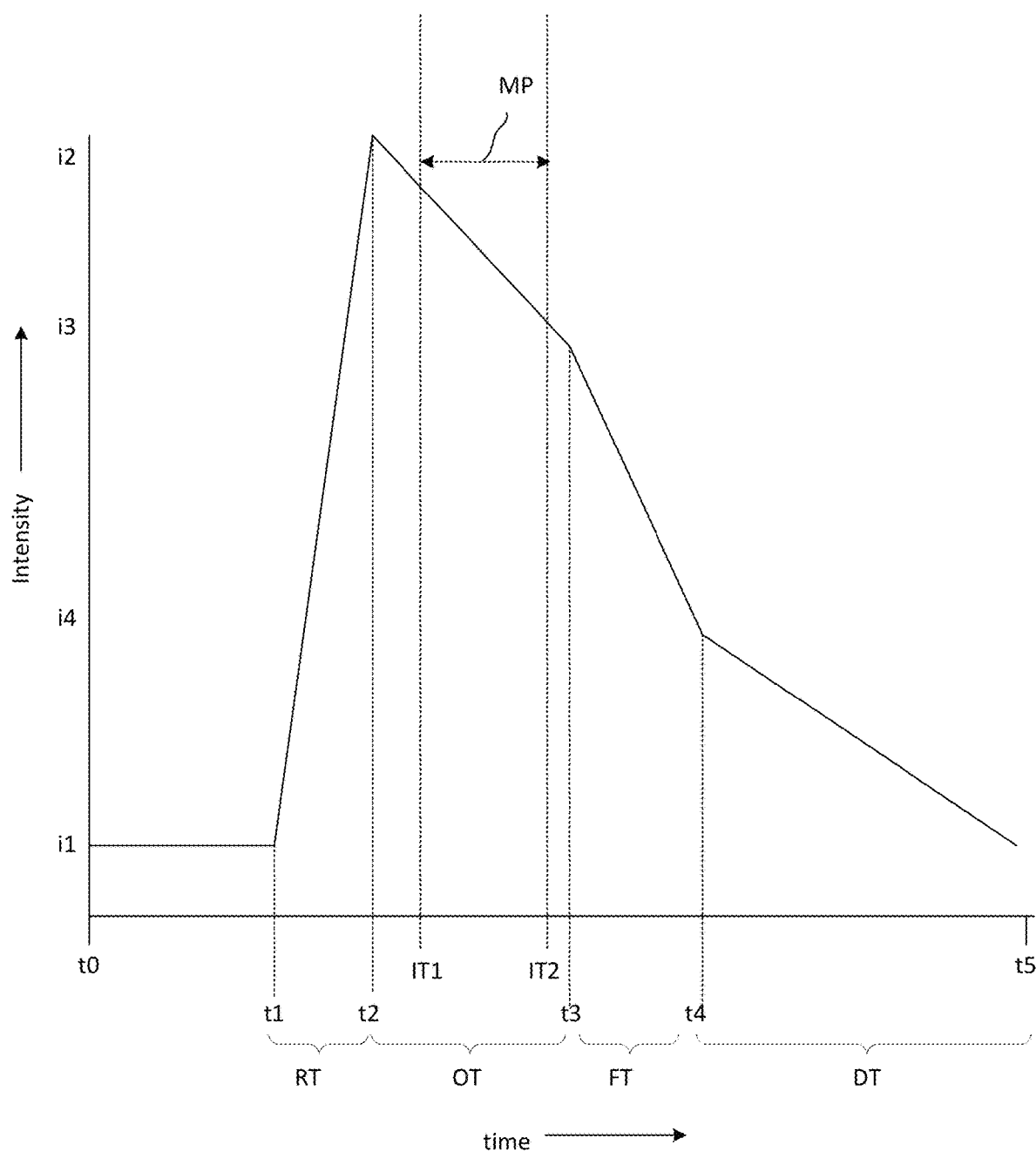
FIG. 4 shows a graph of intensity versus time for a shutter operation and resonator response for cavity buildup dispersion spectroscopy.

Shutter 203 receives coherent electromagnetic radiation 212 from second coherent electromagnetic source 202 and produces modulated electromagnetic radiation 213 from coherent electromagnetic radiation 212 by modulating coherent electromagnetic radiation 212 at a shutter frequency. Shutter 203 can include a modulation device such as a chopper wheel, an amplitude optical modulator, an electro-optic modulator, and the like. Modulated electromagnetic radiation 213 can be optical radiation or radiofrequency radiation that has a wavelength that is the same as a wavelength of coherent electromagnetic radiation 212. The shutter frequency can be from 1 hertz (Hz) to 300 GHz, specifically 1 kHz to 500 MHz, and more specifically 500 kHz to 1 MHz. Operation of shutter 203 predicates production and decay of cavity radiation 224 in resonator 205, e.g., in accord with FIG. 4 that shows a graph of intensity versus time for production of modulated electromagnetic radiation 213 by shutter 203 and measurement period MP of resonator 205 over an exemplary cycle of operation of shutter 203. Here, shutter 203 produces modulated electromagnetic radiation 213 with intensity i1 from time t0 to time t1. At time t1, shutter 203 starts to increase intensity of modulated electromagnetic radiation 213. During rise time RT, shutter 203 increases intensity of modulated electromagnetic radiation 213 from intensity i1 to intensity i2 and continues to produce modulated electromagnetic radiation 213. From time t2 to time t3, shutter 203 continues to produce modulated electromagnetic radiation 213 during on time OT with intensity from intensity i2 to intensity i3. During an arbitrary period of on time OT, resonator 205 receives radiation (e.g., frequency shifted radiation 214, coherent electromagnetic radiation 211), produces cavity radiation 224, and subjects analyte 225 to cavity radiation 224 from interaction time IT1 to interaction time IT2. At time t3, shutter 203 starts to decrease the intensity of modulated electromagnetic radiation 213. During fall time FT from time t3 to time t4, shutter 203 decreases intensity of modulated electromagnetic radiation 213 from intensity i3 to intensity i4. Thereafter, during dead time DT from time t4 to t5, shutter 203 decreases the intensity of modulated electromagnetic radiation 213 from intensity i4 to intensity i1. It should be appreciated that times (t1, t2, t3, t4, t5) and durations of periods (RT, OT, FT, DT, MP) are arbitrarily selectable and tailored for operation of shutter 203 for production of a selected intensity of modulated electromagnetic radiation 213 and a corresponding amount of frequency shifted radiation 214. Moreover, fall time FT of modulated electromagnetic radiation 213 provided by shutter 203 is rapid enough so that decay of cavity radiation 224 in intracavity space 232 of resonator 205 provides transmitted electromagnetic radiation 218 with discernable frequency data so that the change in distance D of resonator 205 or the change in refractive index of analyte 225 can be determined from detector signal 220.

Frequency shifter 204 receives modulated electromagnetic radiation 213 from shutter 203 and produces frequency shifted radiation 214 from modulated electromagnetic radiation 213 by frequency shifting modulated electromagnetic radiation 213 relative to coherent electromagnetic radiation 211 by a shifter frequency. Frequency shifter 204 can include an acousto-optic frequency shifter, electro-optic frequency shifter, and the like. Frequency shifted radiation 214 can be optical radiation or radiofrequency radiation that has a wavelength that is different than the wavelength of coherent electromagnetic radiation 211 by the shifter frequency. The shifter frequency can be from 1 hertz (Hz) to 300 GHz, specifically 1 kHz to 500 MHz, and more specifically 500 kHz to 1 MHz.

Resonator 205 receives frequency shifted radiation 214 from frequency shifter 204 and produces, cavity radiation 224, second coherent radiation 215 or transmitted electromagnetic radiation 218 from frequency shifted radiation 214. An exemplary resonator 205 includes a Fabry-Perot resonator with mirrors 223 separated at distance D by intracavity space 232. Resonator 208 is configured to receive analyte 225 in intracavity space 232, a volume of which can be from 1 µm$^3$ to 10$^6$ m$^3$, specifically from 1 mm$^3$ to 10 m$^3$, and more specifically from 1 cm$^3$ to 10 m$^3$. Distance D can be from 1 µm to 10$^6$ m, specifically from 1 mm to 10 m, and more specifically from 1 cm to 10 m. Analyte 225 can be a gas, liquid, gas, or any combination thereof having a refractive index that is subject to change, which can be interrogated via cavity radiation 224. Exemplary gases are monatomic gases or polyatomic gases that can be inert or reactive. Exemplary liquids include pure liquids as well as compositions of solutes in a solvent or flocculants involving particles dispersed in a liquid. Exemplary solids include homogeneous and heterogeneous solids that are transmissive to cavity radiation 224. Exemplary sensing media include homogeneous and heterogeneous materials that are transmissive to cavity radiation 224 and are responsive to electric and magnetic fields.

Cavity radiation 224 is radiation received by resonator 205 (e.g., coherent electromagnetic radiation 211 or frequency shifted radiation 214) that propagates in intracavity space 232 and accordingly can include frequency shifted radiation 214 in combination with coherent electromagnetic radiation 211. That is, photons of frequency shifted radiation 214 and coherent electromagnetic radiation 211 reflect between mirrors 223 such that a portion of cavity radiation 224 exits from intracavity space 232 via first mirror 223.1 (or antenna 223.3) as second coherent radiation 215 that propagates from resonator 205 to receiver 206 for provision of feedback control signal 217 to electromagnetic source 201. Further, a portion of cavity radiation 224 exits from intracavity space 232 via second mirror 223.2 (or antenna 223.4) as transmitted electromagnetic radiation 218 that propagates from resonator 205 to receiver 209 or discriminator 208 for provision of detector signal 220 from receiver 209. Accordingly, transmitted electromagnetic radiation 218 can include multiple wavelengths of light, i.e., frequency shifted radiation 214 or coherent electromagnetic radiation 211.

Receiver 206 receives second coherent radiation 215 and produces electronic error signal 216 from second coherent radiation 215. Receiver 206 is selected according to a wavelength of second coherent radiation 215 so that receiver 206 can electrically transduce electronic error signal 216. Exemplary receivers 206 include a photo detector, photo multiplier, photo diode, spectrum analyzer, RF network analyzer, and the like.

Loop filter 207 receives electronic error signal 216 from receiver 206 and produces feedback control signal 217 based on electronic error signal 216. Loop filter 217 can include a fine tune input port to receive a fine tune signal from a phase detector; a coarse tune input port to receive a coarse tune signal from a coarse tuner; an output port; a summing element coupled to the fine tune and coarse tune input ports to sum the fine tune and coarse tune signals and to output a summed tune signal; a voltage divider coupled to the summing element to receive the summed tune signal and output a voltage divided signal; and a smoothing filter coupled to the voltage divider and the output port to smooth the voltage divided signal and output a final tune signal as feedback control signal 217 to tune electromagnetic source 201.

In an embodiment, cavity buildup dispersion spectrometer 200 includes discriminator 208 receives transmitted electromagnetic radiation 218 from resonator 205 and produces discriminator signal 219 from transmitted electromagnetic radiation 218. Here, discriminator 208 selectively transmits a band of radiation to receiver 209. Exemplary optical discriminators include differential delay interferometers, a polarizing beam splitter, an optical filter implemented as a fiber Bragg grating (FBG), a planar waveguide grating, or a Fabry-Perot filter (FPF), and the like. A radio frequency discriminator can include a limiter-amplifier and a detector diode.

According to an embodiment, receiver 209 receives transmitted electromagnetic radiation 218 from resonator 205. In some embodiments, discriminator 208 is interposed between resonator 205 and receiver 209, wherein receiver 209 receives transmitted electromagnetic radiation 218 from resonator 205 and discriminator signal gender 19 from discriminator 208. It should be appreciated that when receiver 209 receives a plurality of different frequencies, e.g., that of frequency shifted radiation 214 and that of coherent electromagnetic radiation 211, receiver 209 produces detector signal 220 that has a beat frequency corresponding to an interference between frequency shifted radiation 214 and coherent electromagnetic radiation 211. It is contemplated that a change in the beat frequency of detector signal 220 corresponds to a change in refractive index of analyte 225 in resonator 205 or a change in distance D between mirrors 223.

Detector signal 220 is received by analyzer 210 that produces analyzer signal 221 from detector signal 220. Exemplary analyzers 210 include field programmable gate arrays, digital computers, oscilloscopes, and the like. Analyzer signal 221 includes information with regard to the refractive index of analyte 225 in resonator 205 and distance D between mirrors 223.

Cavity buildup dispersion spectrometer 200 can be made in various ways. It should be appreciated that cavity buildup dispersion spectrometer 200 includes a number of optical and electrical components, wherein such components can be interconnected and placed in communication (e.g., optical communication, electrical communication, and the like) by physical or free-space interconnects. The components can be disposed on mounts that can be disposed on a bulkhead for alignment and physical compartmentalization. As a result, cavity buildup dispersion spectrometer 200 can be disposed in a terrestrial environment or space environment.

In an embodiment, a process for making cavity buildup dispersion spectrometer 200 includes: optically connecting second coherent electromagnetic source 202 to electromagnetic source 201 by extracting a portion of coherent electromagnetic radiation 211 from first coherent electromagnetic source 201 using partially reflective or transmissive elements, or by frequency locking the coherent electromagnetic radiation 211 and the coherent electromagnetic radiation 212 to a frequency locked electromagnetic source or to a resonator; optically connecting shutter 203 to second coherent electromagnetic source 202 by waveguides, optical fibers or free space coupling; optically connecting frequency shifter 204 to shutter 203 by waveguides, optical fibers or free space coupling; optically connecting resonator 205 to receiver 206 by polarization controlling, polarization selecting, or polarization discriminating elements; electrically connecting receiver 206 to loop filter 207 by coaxial cabling or a wireless connection; electrically connecting loop filter 207 to electromagnetic source 201 by coaxial cabling or a wireless connection; optically connecting resonator 205 to discriminator 208 by a waveguide, optical fiber or free space coupling; optically connecting discriminator 208 to receiver 209 by a waveguide, optical fiber or free space coupling; and electrically connecting receiver 209 to analyzer 210 by coaxial cabling, waveguide or a wireless connection.

Cavity buildup dispersion spectrometer 200 and processes disclosed herein have numerous beneficial uses. In an embodiment, a process for performing cavity buildup dispersion spectroscopy with cavity buildup dispersion spectrometer 200 includes: receiving, by shutter 203, coherent electromagnetic radiation 212 by coupling through a waveguide, optical fiber or free space; modulating, by shutter 203, coherent electromagnetic radiation 212 at shutter frequency; producing, by shutter 203, modulated electromagnetic radiation 213 from coherent electromagnetic radiation 212 by electro-optic or acousto-optic phase or frequency modulation or a physical or mechanical shuttering device; receiving, by frequency shifter 204, modulated electromagnetic radiation 213 from shutter 203 by coupling through a waveguide, optical fiber or free space; frequency shifting, by frequency shifter 204, modulated electromagnetic radiation 213 by shifter frequency by electro-optic or acousto-optic phase or frequency modulation; receiving, by resonator 205, frequency shifted radiation 214 from frequency shifter 204 by waveguide, optical fiber or free space coupling; receiving, by resonator 205, coherent electromagnetic radiation 211 by waveguide, optical fiber or free space coupling; producing, by resonator 205, cavity radiation 224, in intracavity space 232, from frequency shifted radiation 214 and coherent electromagnetic radiation 211 by excitation of a cavity mode; receiving, by resonator 205, analyte 225 in intracavity space 232 by the analyte occupying the mode volume of resonator; subjecting analyte 225 to cavity radiation 224 by the analyte being present in the mode volume during the shutter 203 on time (OT); transmitting cavity radiation 224 as transmitted electromagnetic radiation 218 from resonator 205 by waveguide, optical fiber or free space coupling; receiving, by receiver 209, transmitted electromagnetic radiation 218 from resonator 205 by waveguide, optical fiber or free space coupling; and producing, by receiver 209, detector signal 220 from transmitted electromagnetic radiation 218 to perform cavity buildup dispersion spectroscopy by RF detector, antenna, optical diode or other transducer, wherein detector signal 220 includes beat frequency 231 that corresponds to a change in a motion of resonator 205 that includes a change in the distance between mirrors 223 or a change of refractive index of analyte 225 in intracavity space 232. According to an embodiment, determining the change in the distance or refractive index from detector signal 220.

In an embodiment, performing cavity buildup dispersion spectroscopy includes receiving, by frequency locking loop 222, second coherent radiation 215 from resonator 205 by waveguide, optical fiber or free space coupling; producing, by frequency locking loop 222, coherent electromagnetic radiation 211 from second coherent radiation 215 by phase sensitive feedback to first coherent electromagnetic source 201; and communicating coherent electromagnetic radiation 211 to second coherent electromagnetic source 202 from frequency locking loop 222 by measuring the beat frequency between coherent electromagnetic radiation 211 and coherent electromagnetic radiation 212, and performing a phase locking loop, or by extracting a portion of radiation from first coherent electromagnetic source 201 using partially reflective or transmissive elements, or by frequency locking the coherent electromagnetic radiation 211 and the coherent electromagnetic radiation 212 to a frequency locked electromagnetic source or to a resonator.

In an embodiment, performing cavity buildup dispersion spectroscopy includes producing, by resonator 205, second coherent radiation 215 from cavity radiation 224 by receiving cavity radiation reflected by mirror 223.1 and cavity radiation 224 transmitted by mirror 223.1; and communicating, by resonator 205, second coherent radiation 215 to frequency locking loop 222 by waveguide, optical fiber or free space coupling and electrically connecting to receiver 206.

Figure 12:
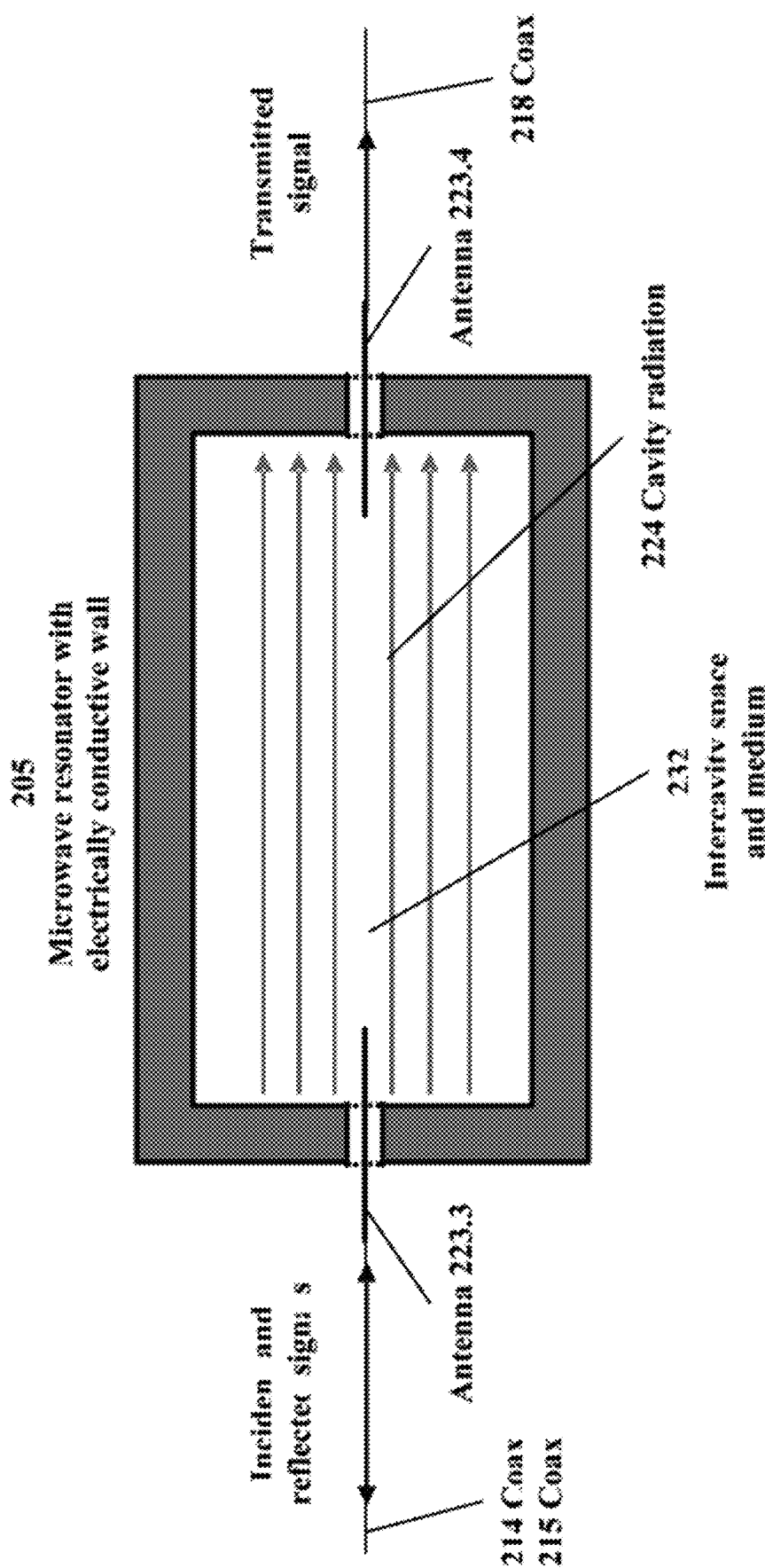
FIG. 12 shows a radiofrequency cavity buildup dispersion spectrometer.

In an embodiment, with reference to FIG. 12, performing cavity buildup dispersion spectroscopy includes producing by resonator 205, second coherent radiation 215 from cavity radiation 224 by receiving cavity radiation reflected by antenna 223.3 and cavity radiation transmitted by antenna 223.3, and communicating, by resonator 205, second coherent radiation 215 to frequency locking loop 222 by coaxial cable connecting to receiver 206.

In an embodiment, performing cavity buildup dispersion spectroscopy includes receiving, by receiver 206 of frequency locking loop 222, second coherent radiation 215 from resonator 205 by receiving cavity radiation reflected by mirror 223.1 and cavity radiation 224 transmitted by mirror 223.1; producing, by receiver 206, electronic error signal 216 from second coherent radiation 215 by phase sensitive discrimination of coherent radiation 215; receiving, by loop filter 207 of frequency locking loop 222, electronic error signal 216 from receiver 206 by coaxial cabling, waveguide, or a wireless connection; producing, by loop filter 207 of frequency locking loop 222, feedback control signal 217 from electronic error signal 216 by measurement, filtering and amplification of electronic error signal; receiving, by electromagnetic source 201, feedback control signal 217 from loop filter 207 by electrically connecting using coaxial cabling, waveguide, or wireless connection; producing, by electromagnetic source 201, coherent electromagnetic radiation 211 by voltage or current actuation driven by electronic feedback signal 201; and communicating coherent electromagnetic radiation 211 to second coherent electromagnetic source 202 and resonator 205 from electromagnetic source 201 by waveguide, optical fiber or free space coupling.

In an embodiment, performing cavity buildup dispersion spectroscopy includes receiving, by second coherent electromagnetic source 202, coherent electromagnetic radiation 211 from the electromagnetic source 201 by waveguide, optical fiber or free space coupling or by extracting a portion of radiation of radiation from first coherent electromagnetic source 201 using partially reflective or transmissive elements; producing, by second coherent electromagnetic source 202, coherent electromagnetic radiation 212 from coherent electromagnetic radiation 211; and communicating coherent electromagnetic radiation 212 to frequency locking loop 222 from second coherent electromagnetic source 202 and first coherent electromagnetic source 201.

In an embodiment, performing cavity buildup dispersion spectroscopy includes receiving, by resonator 205, coherent electromagnetic radiation 211 from electromagnetic source 201 by waveguide, optical fiber or free space coupling.

In an embodiment, performing cavity buildup dispersion spectroscopy includes receiving, by discriminator 208, transmitted electromagnetic radiation 218 from resonator 205; producing, by discriminator 208, discriminator signal 219 from transmitted electromagnetic radiation 218 by polarization discriminating elements or frequency dependent delay line; communicating discriminator signal 219 to receiver 209 from discriminator 208 by waveguide, optical fiber or free space coupling, and producing, by receiver 209, detector signal 220 from discriminator signal 219 by RF power detector or optical diode.

In an embodiment, performing cavity buildup dispersion spectroscopy includes receiving, by analyzer 210, detector signal 220 from receiver 209 by electrically connecting receiver 209 to analyzer 210 by coaxial cabling or a wireless connection; and producing, by analyzer 210, analyzer signal 221 from detector signal 220 by use of an electronic spectrum analyzer.

It should be appreciated that cavity buildup dispersion spectrometer 200 and performing cavity buildup dispersion spectroscopy herein described provide frequency-domain optical read-out of an instantaneous electric field of laser light transmitted through an optical resonator under heterodyne buildup or repumping conditions at an arbitrary time delay relative to an initial cavity ring-down event. Moreover, cavity buildup dispersion spectrometer 200 and performing cavity buildup dispersion spectroscopy provides simultaneous measurement of optical resonator round-trip light attenuation, referred to as loss, or round-trip phase shifts, referred to as dispersion, in the frequency domain by isolating optical beating of the transmitted electric fields on a photodetector. Conventional methods can include multiple measurement schemes, laser scanning, or additional local oscillator beams. Advantageously, cavity buildup dispersion spectrometer 200 and performing cavity buildup dispersion spectroscopy can include a single probe laser beam. By control of the probe beam laser frequency relative to the cavity resonance and power during cavity ring-down events, cavity repumping occurs at arbitrary delays for controlling a selected beat signal in transmission and providing frequency-domain absorption and dispersion spectroscopy simultaneously in an absence of a separate optical local oscillator.

Cavity buildup dispersion spectrometer 200 and performing cavity buildup dispersion spectroscopy solves an accuracy measurement problem of complex refractive index of materials such as pure gases, trace gases and aerosols, as well as optical coatings, atomic and molecular monolayers and condensed-phase large molecules, e.g., proteins and the like. By performing read-out of an optical beat signal such as an alternating current or AC signal, cavity buildup dispersion spectrometer 200 and performing cavity buildup dispersion spectroscopy overcomes limitations of conventional read-outs operating at direct current (DC) and overcomes flicker noise limitations and digitizer nonlinearity biases.

Cavity buildup dispersion spectrometer 200 and performing cavity buildup dispersion spectroscopy can perform refractive index sensing for atomic and molecular absorption, bulk material properties, resonant and non-resonant complex susceptibilities, and the like. Additionally, cavity buildup dispersion spectrometer 200 and performing cavity buildup dispersion spectroscopy can perform physical sensing of length displacement, velocity, acceleration, pressure, force, acoustics, electric fields, magnetic fields, and the like. Moreover, cavity buildup dispersion spectrometer 200 and performing cavity buildup dispersion spectroscopy can integrate with conventional frequency counters for read-out of complex refractive index and length displacement. Further, Cavity buildup dispersion spectrometer 200 and performing cavity buildup dispersion spectroscopy operates in an absence of advanced software approaches to line shape fitting and laser scanning so that information is condensed into a single number of the beat frequency, which is recorded with high precision and traceability to the international system of units (SI) definition of the second for accuracy with simplicity that is highly desirable.

Advantageously, cavity buildup dispersion spectrometer 200 overcomes limitations of technical deficiencies of conventional devices such as conventional absorption spectrometers or cavity-enhanced spectrometers based on resonator decay rates or transmission of radiation, which do not measure complex refractive index of the analyte. Further, cavity buildup dispersion spectrometer overcomes limitations of measurements speed and detector nonlinearity that occur with other cavity-enhanced methods. Cavity buildup dispersion spectroscopy as an AC technique that encodes the relevant information in the pattern of zero crossings of the oscillating signal, is inherently immune to high order harmonics produced by the nonlinear response of the analyzer.

Cavity buildup dispersion spectrometer 200 and processes herein unexpectedly provides information on time scales as short as the round-trip time of the electromagnetic radiation within the resonator, which for high-Q systems is orders of magnitude shorter than the decay time of the resonator. This temporal response makes measurements by the cavity buildup dispersion spectrometer inherently more rapid than those performed by conventional cavity enhanced spectroscopy methods that are rate limited by resonator decay times or transmittance. Moreover, cavity buildup dispersion spectrometer 200 provides accurate, first-principles measurements of refractive index, cavity length, and the like, that are directly linked to the SI dimensions of time or frequency, precluding the need for calibration against reference materials.

The articles and processes herein are illustrated further by the following Examples, which are non-limiting.

EXAMPLES

Example 1. Intermode Cavity Build-Up Spectroscopy

Figure 9:
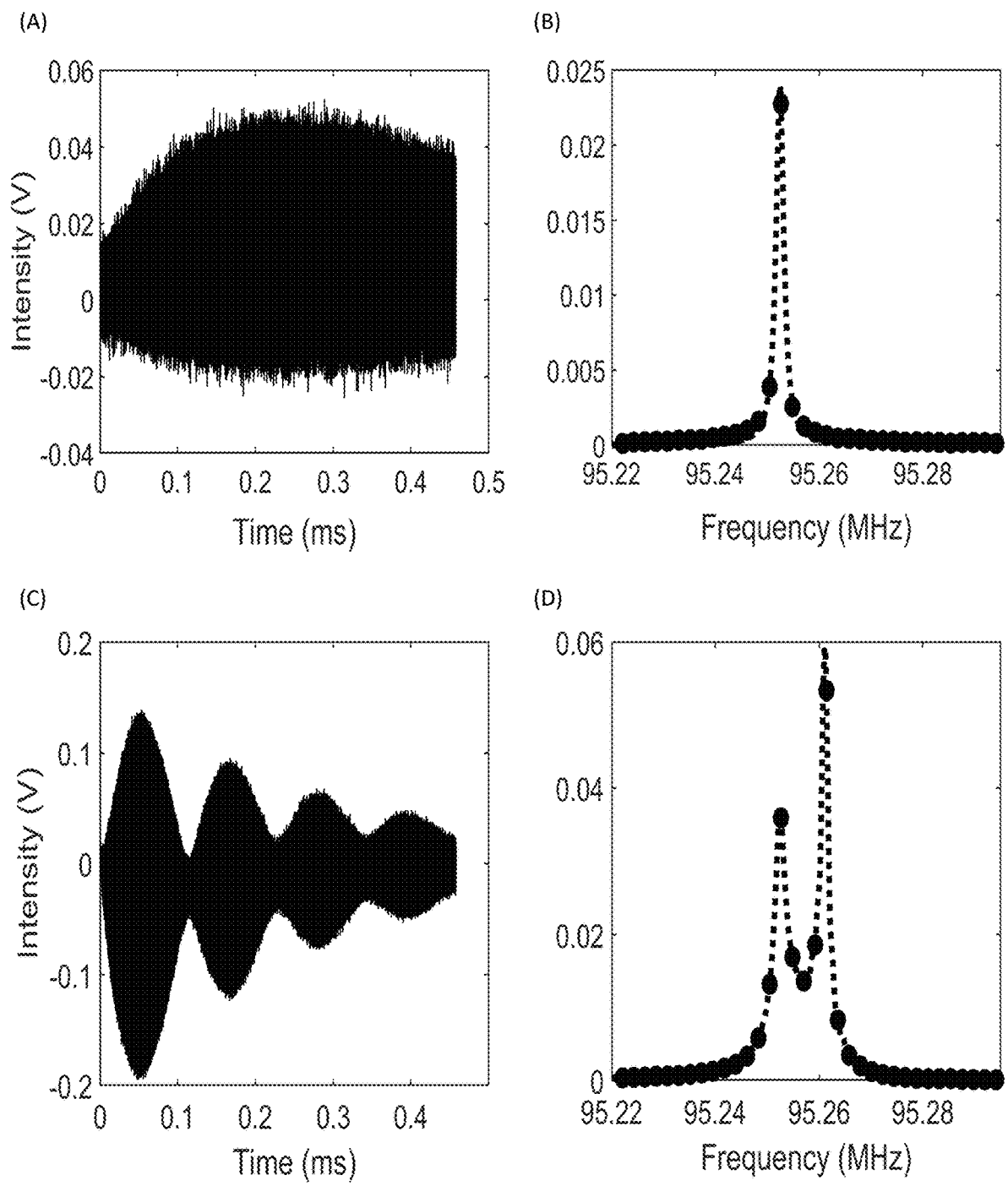
FIG. 9 shows Graphs of intensity versus time in panels A and C and respective graphs of intensity versus frequency in panels B and D.

Intermode cavity buildup spectroscopy (ICBUS) was performed. FIG. 9 shows two half-cycles from a heterodyne-detected cavity ring-down spectroscopy (HD-CRDS) style of alternating adjacent cavity mode transmission signal acquisition. The top panels show the time-domain (left) and Fourier domain (right) spectrum of a half cycle with the pumping frequency f3 228 nominally on-resonance (analogous to HD-CRDS). The dashed trace in the top right panel is a Lorentzian fit. The bottom panels show the second half cycles, with the pumping beam now off-resonance by a programmed detuning beat frequency 231 of $\Delta v_{beat}$=8.75 kHz (>10 cavity half-widths). The trace in the bottom right panel is the fit within the beat region near $v_{fsr}$ to a modified electric-field ICBUS model (two frequencies plus one cross term only). Floated in the Fourier domain analysis were values of $v_{fsr}$, $\Delta v_{beat}$, and the cavity mode decay rate ($\Gamma$).

Figure 10:
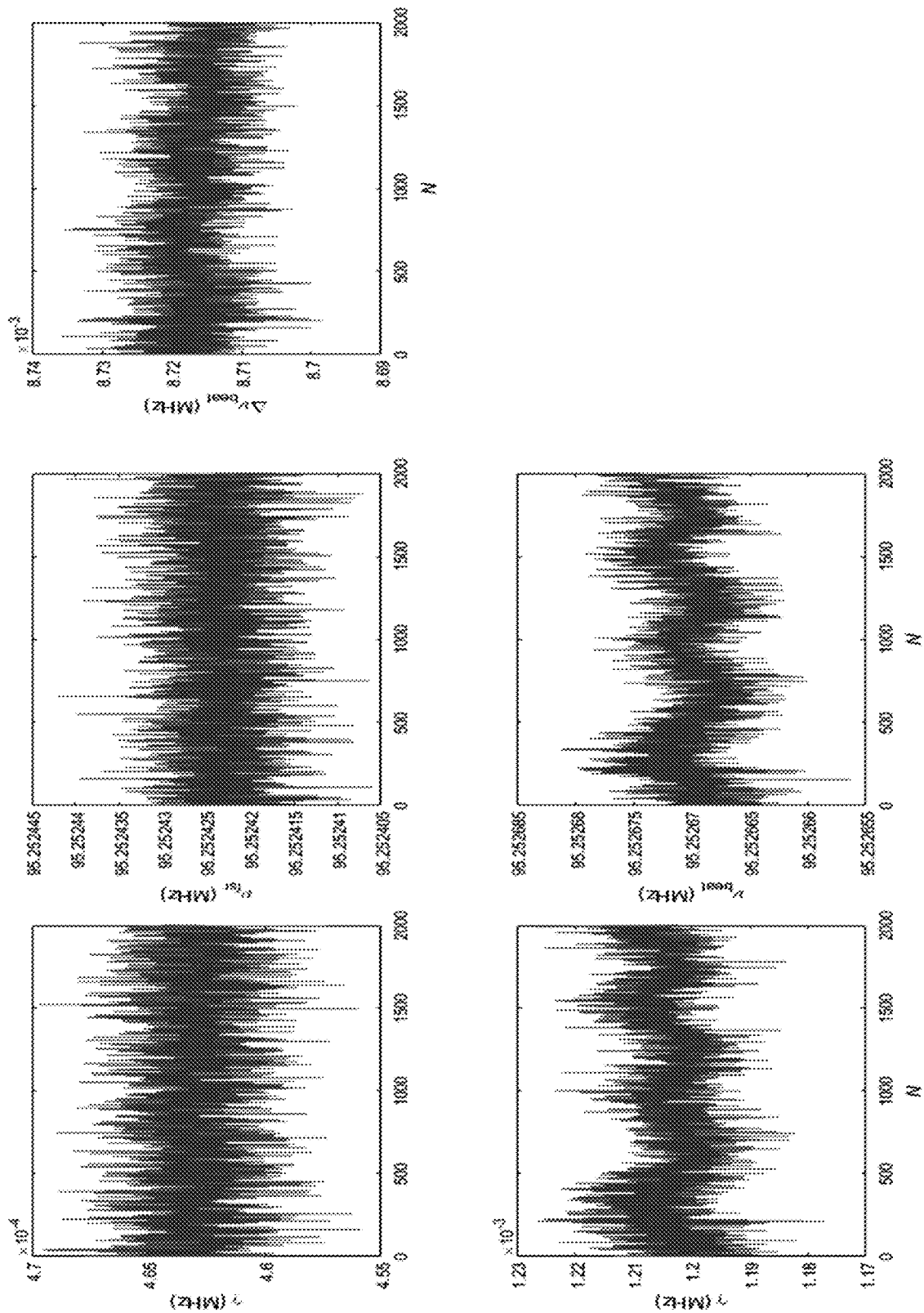
FIG. 10 shows: top panels, intermode cavity buildup spectroscopy (ICBUS); bottom panels, half cycle with the pumping frequency nominal on-resonance (HD-CRDS)

FIG. 10 shows fitted parameters from a continuous time series of pairs of alternating half cycles. ICBUS model results are shown in the top three panels ($\Gamma$, $v_{fsr}$, and $\Delta v_{beat}$), and the HD-CRDS results are in the bottom two panels ($\Gamma$, $v_{beat}$).

Figure 11:
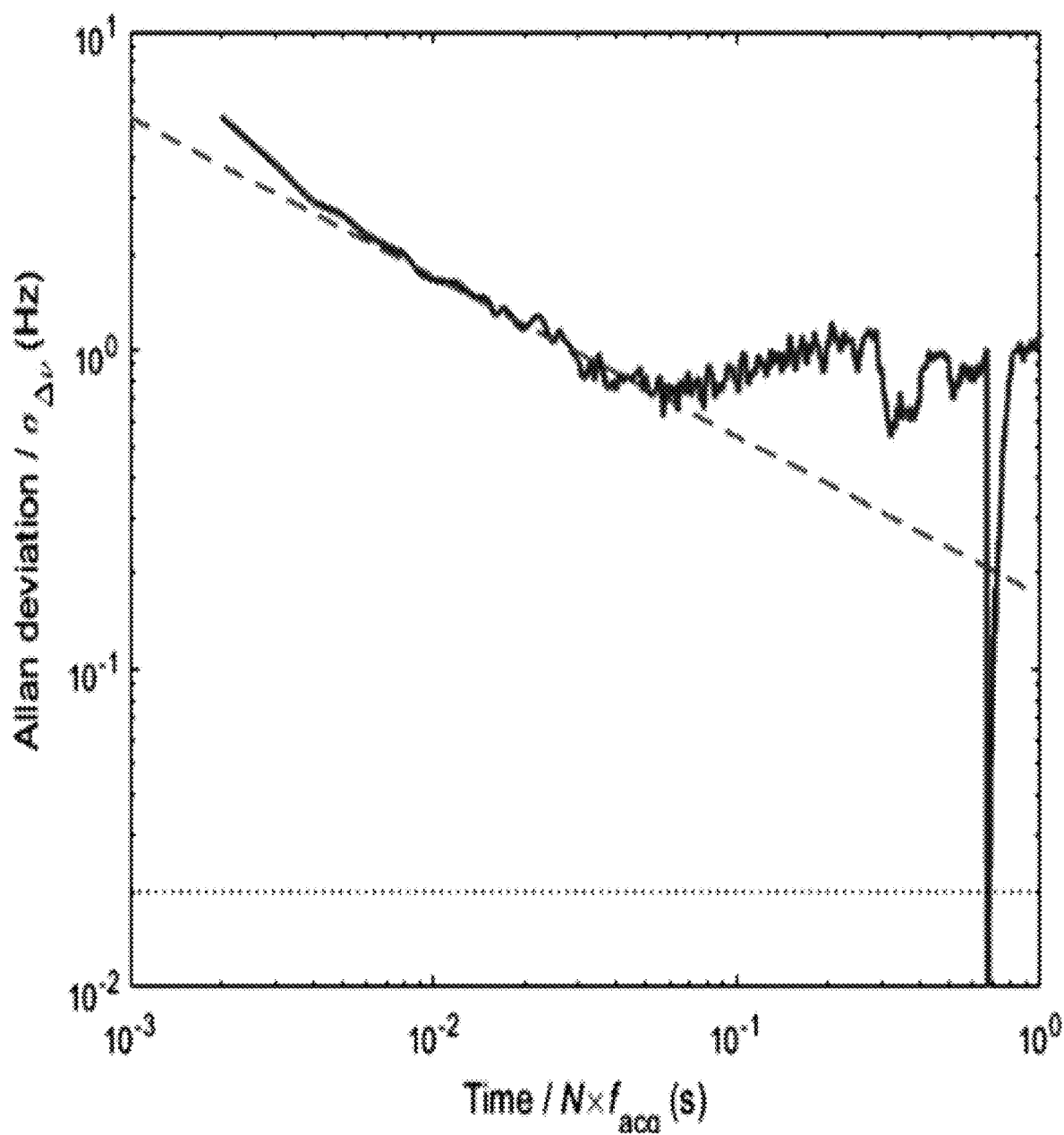
FIG. 11 shows a graph of Allan deviation of $\Delta v_{beat}$.

The Allan deviation of $\Delta v_{beat}$ is plotted versus time in FIG. 11. The fitted value of $\Delta v_{beat}$ hits a flicker noise floor of ~1 Hz. This is likely limited by the Pound-Drever-Hall (PDH) phase-locked loop, maybe from 1/f noise in the electronic circuit. ICBUS should be limited by the linewidth of the locked laser relative to the cavity, a limit of mutual coherence in the transient time-domain signals. Also shown in FIG. 11 is a dashed line for thermal-noise limit for the optical cavity stability for which measurement of $v_{fsr}$ is not subject to this limitation.

Fitted precision on the ICBUS fitted parameters was reduced when the PDH lock performance was degraded, but accuracy was not. This is not present in HD-CRDS, wherein accuracy in the Fourier domain analysis was degraded by the PDH lock.

Example 2. Cavity Buildup Dispersion Spectroscopy

Measurements of ultrahigh-fidelity absorption spectra can help validate quantum theory, engineer ultracold chemistry, and remotely sense atmospheres. Recent achievements in cavity-enhanced spectroscopy using either frequency-based dispersion or time-based absorption approaches have set new records for accuracy with uncertainties at the sub-per-mil level. However, laser scanning or susceptibility to nonlinearities limits their ultimate performance. Here we present cavity buildup dispersion spectroscopy (CBDS) in which the dispersive frequency shift of a cavity resonance is encoded in the cavity's transient response to a phase-locked non-resonant laser excitation. Beating between optical frequencies during buildup exactly localizes detuning from mode center, and thus enables single-shot dispersion measurements. CBDS can yield an accuracy limited by the chosen frequency standard and measurement duration and is currently 50 times less susceptible to detection nonlinearity compared to intensity-based methods. Moreover, CBDS is significantly faster than previous frequency-based cavity-enhanced methods. The generality of CBDS shows promise for improving fundamental research into a variety of light-matter interactions.

Highly accurate models of light-matter interactions can be used for fundamental studies of molecular hydrogen, engineering of ultracold chemistry, tests of molecular structure calculations, modeling of planetary atmospheres, and the development of advanced spectroscopic databases. The latter application can provide improvements in remote sensing and measurements of variations in greenhouse gas concentrations at 0.1% uncertainty levels required to better predict changes in earth's climate. To develop and test these models using first-principles approaches, accurate experimental techniques are required.

Recent achievements in cavity-enhanced spectroscopy using either frequency-based dispersion or time-based absorption approaches have set new records for accuracy with uncertainties at the sub-per-mil level. However, laser scanning or susceptibility to nonlinearities limits their ultimate performance. Cavity mode-dispersion spectroscopy (CMDS) is one such technique recently developed to meet these challenges. While CMDS yields absorption spectra entirely in terms of measured optical frequency shifts, the shifts are not read out instantaneously. This is also true for multiplexed approaches to CMDS performed with a broadband optical frequency comb. Consequently, these CMDS techniques are susceptible to drifts. Although frequency-agile rapid scanning (FARS) spectroscopy provides single-shot acquisition of local absorption limited only by the cavity response time, it is an intensity-based technique and inherently susceptible to nonlinearities in the detection system. Therefore, each of these established techniques in ultrasensitive absorption spectroscopy has a critical weakness.

Cavity buildup dispersion spectroscopy (CBDS) provides an accurate measurement of cavity mode frequency that can be implemented on time scales that are substantially shorter than the cavity buildup time. In CBDS, a frequency-locked laser beam is instantaneously injected into a high-finesse cavity followed by observation of the transient transmitted signal. The net response involves optical interference between the excitation and the transient cavity fields, with the latter field occurring at the local cavity resonance frequency and in opposition to the former field. Thus, measurement of the resulting heterodyne beat frequency provides the local cavity mode position. In practice, absorption-induced dispersion within the resonator leads to changes in the measured mode-by-mode beat frequencies, which yield dispersion spectra. CBDS measurements can be made on timescales equal to or significantly less than the buildup duration and show the method to be highly immune to nonlinear response in the detection system. This speed makes possible entirely new studies in dynamic cavity response for physical sensing, as well as time-resolved spectroscopy of transient free radicals and other short-lived species in both thermal and non-thermal gases.

Techniques in condensed-phase sensing can use micro-resonators with optical quality factors of $Q \leq 10^8$ to readout dispersive signals on nanosecond timescales. Those approaches leverage heterodyne and rapidly swept laser cavity ring-down readout concepts developed decades ago to reduce technical noise and improve sensitivity. Dispersive sensing uses decaying signals which occur after the cavity driving field is effectively extinguished. Unlike this Example, dispersive micro-resonator sensors do not probe the temporal region associated with cavity buildup—a regime which includes two synchronous fields of interest here: a non-resonant laser-driven field with rapidly changing amplitude and the cavity's transient response to this field which always occurs at the cavity resonance frequency.

Here, dispersion spectroscopy was performed in the transient buildup regime. The CBDS approach requires the sequential injection of discrete and arbitrarily detuned laser fields that are optically phase-coherent with the resonant cavity field. The use of high-Q, macroscopic-length resonators allows one to set acquisition times in the microsecond range. Therefore, the measurement paradigm does not sacrifice ability to study a wide range of dynamic phenomena. In addition, the cavity buildup dispersion spectrometer establishes immunity of CBDS to common nonlinearities and biases that can occur with conventional intensity-based cavity-enhanced spectroscopy methods. Interrogation of consecutive cavity modes via buildup signals to measure broadband phenomena such as molecular absorption spectra is unavailable in conventional devices and methods.

With respect to transient cavity response to single-mode, non-resonant excitation, a conventional, linear optical cavity formed by two mirrors has intensity reflectivity R and separated by a distance L. The cavity is filled with an intracavity gas medium described by an absorption coefficient $\alpha$. Assuming lossless mirrors, we define an effective mirror reflectivity and round-trip time of the empty cell as $R_{eff} = Re^{-\alpha L}$ and $t_r = 2 nL/c = 1/\delta\nu_{FSR}$, respectively, where c is the speed of light in vacuum, n is the refractive index of the absorptive medium and $\delta\nu_{FSR}$ is the cavity free spectral range (FSR). Consider the single excitation of cavity longitudinal mode order q of angular frequency $\omega_q$ by an optical electric field of angular frequency $\omega_c$ and amplitude $\in$ given by $E_i(t) = \in e^{i\omega_c t}$, which is instantaneously switched on at time $t=0$. The net time response of the field transmitted by the cavity $E_{out}(t)$ can be calculated by summing contributions over a finite number of M passes in the cavity realized from $t_r/2$ to t and leads to the following form $$E_{out}(t) = E_{out}^0 [e^{i\omega_c t} - e^{-\Gamma_q t} e^{i\omega_q t}], \quad (1)$$

wherein $$E_{out}^0 = \frac{\in}{t_r} \frac{(1-R)e^{-\alpha L/2}}{\Gamma_q + i\delta\omega},$$

and $\Gamma_q = -t_r^{-1} \ln(R_{eff})$ describes the width (HWHM) of q-th cavity mode. The resulting field involves the sum of two fields: the excitation term proportional to $e^{i\omega_c t}$ and the transient response of the cavity (Green's function) given by $e^{-\Gamma_q t} e^{i\omega_q t}$. It can be easily shown that $(2\Gamma_q)^{-1}$ is the conventional intensity-based time constant, $\tau$, of a light decay measured in cavity ring-down spectroscopy (CRDS). The structure of Eq. (1) illustrates how the induced transient field of the cavity tends to oppose the driving field and causes interference which is manifest as a decaying beat signal at angular frequency $\delta\omega = \omega_c - \omega_q$.

In order to compute the intensity, we square the real-valued part of the complex-analytic field from Eq. (1). To account for the finite detector bandwidth, we ignore the resulting optical frequency terms in the beat signal. These operations yield the detected intensity exiting the cavity as $$I_{out}(t) = I_{out}^0 [1 + e^{-2\Gamma_q t} - 2e^{-\Gamma_q t} \cos(\delta\omega t)], \quad (2)$$

where $I_{out}^0 = |E_{out}^0|^2/2$. Equation (2) describes the time-dependent buildup signal in the CBDS method. Note the occurrence of two characteristic rates, one at $2\Gamma_q$ equal to the familiar ring-down intensity decay rate, and the other at half of this value, which corresponds to the decay rate of the induced transient cavity field.

Figure 5:
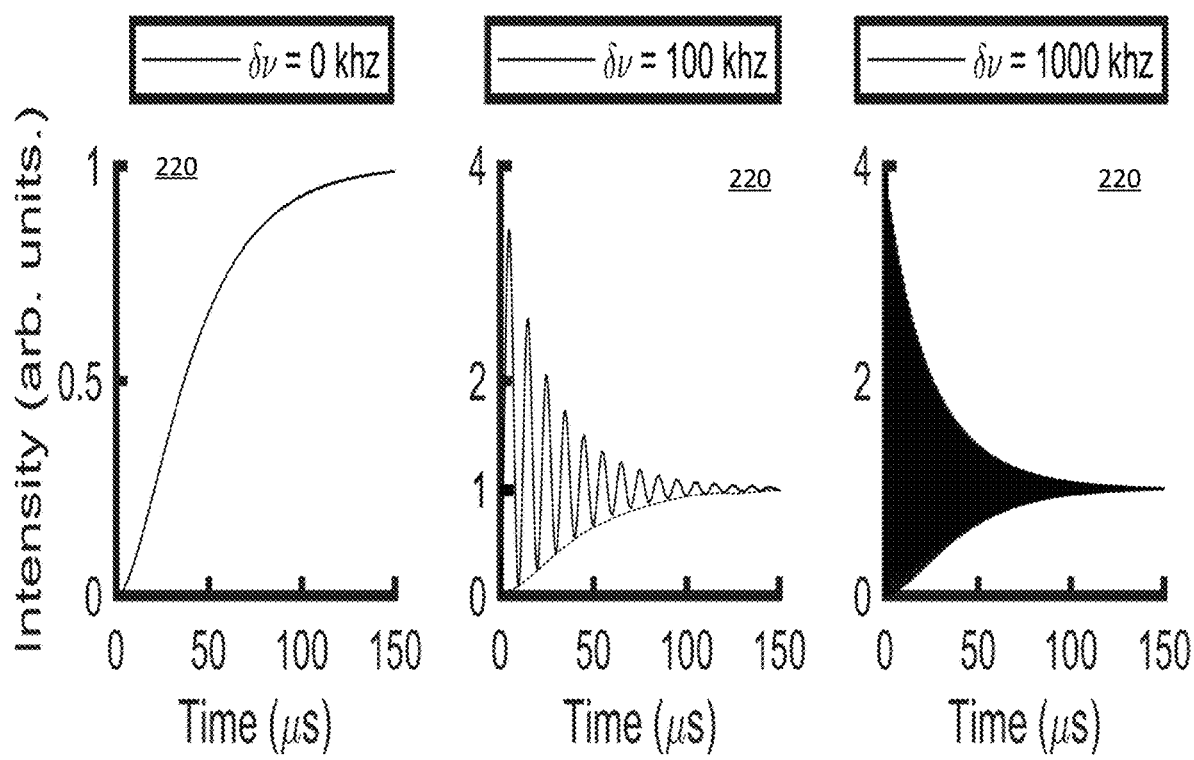
FIG. 5 shows graphs of intensity versus time.

Representative simulations of detector signal 220 are plotted in FIG. 5 using the model presented in Eq. (2) and a familiar ring-down intensity decay rate of $2\Gamma_q = 33$ kHz. In the left panel, detector signal 220 includes information about a beat frequency 231 $[\delta\nu = \delta\omega/(2\pi)]$ that is equal to 0 kHz. In the central panel, detector signal 220 includes information about a beat frequency 231 that is equal to 100 kHz. In the right panel, detector signal 220 includes information about a beat frequency 231 that is equal to 1000 kHz.

For reasons discussed below, it is useful to analyze CBDS signals in the frequency domain. Taking the Fourier transform of $I_{out}(t)$ and neglecting the DC term gives the function $$\mathcal{F}(\omega) = I_{out}^0 \left( \frac{1}{2\Gamma_q - i\omega} - \frac{1}{\Gamma_q - i(\omega + \delta\omega)} - \frac{1}{\Gamma_q - i(\omega - \delta\omega)} \right), \quad (3)$$

which is the sum of three complex Lorentzian resonances. The first resonance is centered at $\omega = 0$, and corresponds to decay of intensity in the transient field. The other two resonances are at $\omega = \pm\delta\omega$ and describe the slower decay of the intensity in the beat signal caused by interference between the two fields. In practice, we can use Eq. (3) to calculate the real-valued quantity, $|\mathcal{F}(\omega)|^2$, to model the power spectral density of the measured CBDS signal. Evaluation of $|\mathcal{F}(\omega)|^2$ leads to three symmetric Lorentzian components and three asymmetric, dispersive components associated with the off-diagonal terms.

Figure 6:
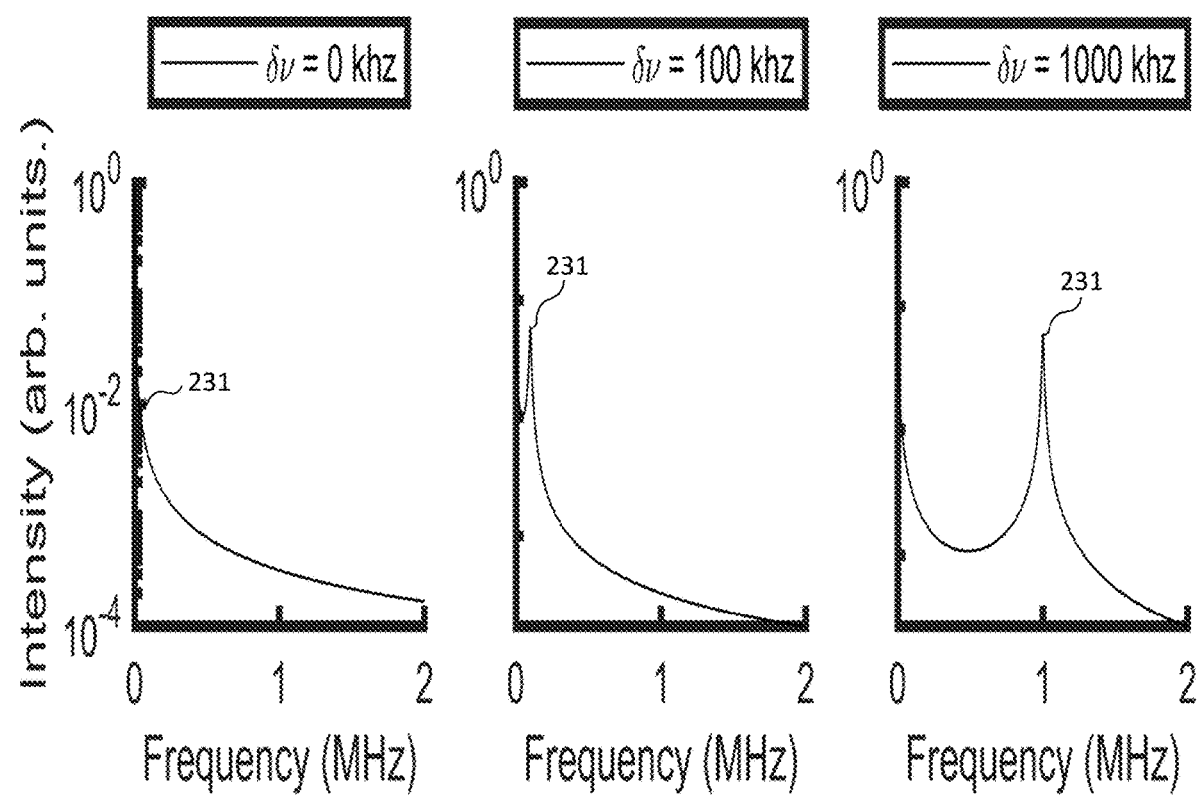
FIG. 6 shows graphs of Intense intensity versus frequency.

Representative simulations of the square of the Fourier transform of the time-domain signals in FIG. 5 are plotted in FIG. 6. Peaks in the Fourier power spectra in FIG. 6 identify each beat frequency 231. The left panel includes information about a beat frequency 231 $[\delta\nu = \delta\omega/(2\pi)]$ that is equal to 0 kHz. The central panel includes information about a beat frequency 231 that is equal to 100 kHz. The right panel includes information about a beat frequency 231 that is equal to 1000 kHz.

The parameters used to simulate several detector signal 220 in FIG. 5 and calculate their respective Fourier power spectra in FIG. 6 which contain several beat frequency 231 correspond to our experimental conditions. The time-dependent buildup signal in the right panel of FIG. 5 exhibits large damped oscillations with a peak signal that is four times greater than the asymptotic value reached at long times. These strong oscillations occur when the frequency detuning is greater than the cavity linewidth, (i.e. $\delta\omega/\Gamma_q > 1$). For smaller frequency detuning values, the period of oscillation is longer than the cavity decay time so that $I_{out}(t) \to I_{out}^0 [1 - e^{-\Gamma_q t}]^2$, which as expected for on-resonance excitation of the ring-down cavity (left panel of FIG. 5), reduces to a monotonically increasing field amplitude described by the complement of the exponential decay function. In FIG. 6, we compare the power spectral density obtained from the Fourier transform (FT) of the time domain signal and the analytical Fourier transform is given in Eq. (3). Two of the resonances (one at DC and the other at the positive value of the beat frequency) are evident, whereas the other resonance at negative frequencies contributes via its wing. In contrast, ignoring the three dispersive terms in $|\mathcal{F}(\omega)|^2$ and using a simplified three-component symmetric Lorentzian model for this quantity leads to systematic residuals at the 1% level.

With regard to sensitivity of CBDS to absorption coefficient and measurement speed, the CBDS buildup signal, $I_{out}(t)$, depends on the sample absorption coefficient, $\alpha_q$, through the mode width, $\Gamma_q$, as well as the beat frequency term $\delta\omega$ which encodes information about the position of mode $\omega_q$. The change of mode width $\Delta\Gamma_q$ caused by absorption $\alpha_q$ in the cavity medium is $$\Delta\Gamma_q = \frac{c}{2}\alpha_q$$

and is linked to the corresponding dispersive cavity mode shift, $\delta\omega_D$, by the complex-valued refractive index $n(\omega)=n_0+\chi(\omega)/(2n_0)$ and resonant susceptibility $\chi(\omega)=\chi'(\omega)-i\chi''(\omega)$, which for an isolated spectral line may be written using the complex-valued line shape function $\mathcal{L}(\omega)$ $$\frac{\delta\omega_D}{\Delta\Gamma_q} = -\frac{\chi'}{n_0\chi''} = \frac{\text{Im}\{\mathcal{L}(\omega_q - \omega_0)\}}{n_0 \text{Re}\{\mathcal{L}(\omega_q - \omega_0)\}}, \quad (4)$$

where $n_0$ is non-resonant refractive index of the sample and $\omega_0$ is the center of spectral line.

To assess the theoretical precision and speed limits of CBDS compared to CRDS, we fitted the appropriate model for each method to $I_{out}(t)$ signals simulated with Gaussian noise. For both techniques, we considered signals with identical signal-to-noise-ratio levels of $$SNR = 3000, \quad \frac{\chi'}{n_0\chi''} = 1$$

Figure 7:
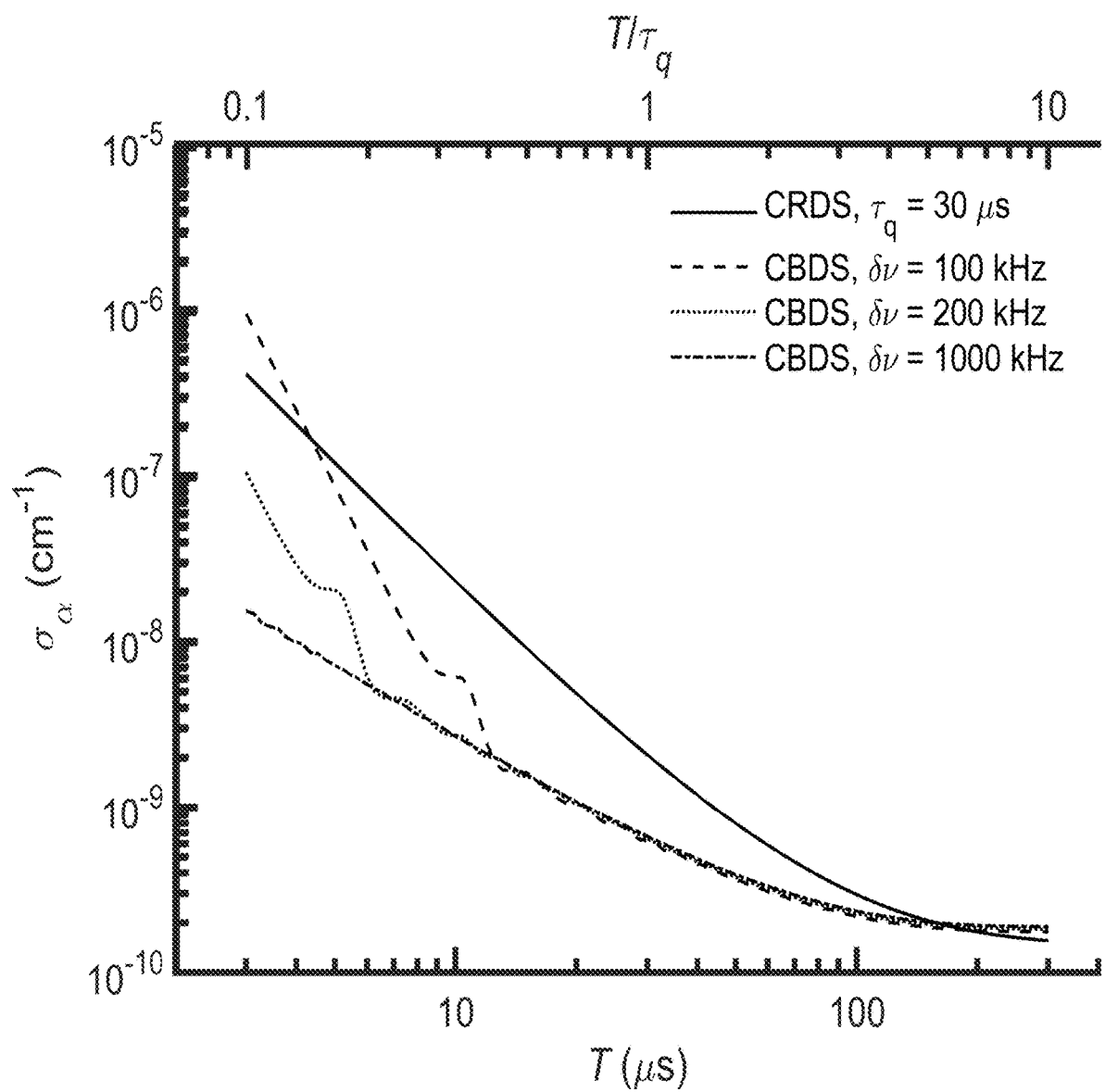
FIG. 7 shows a graph of absorption coefficient purses normalized signal analysis period and signal analysis period.
Figure 8:
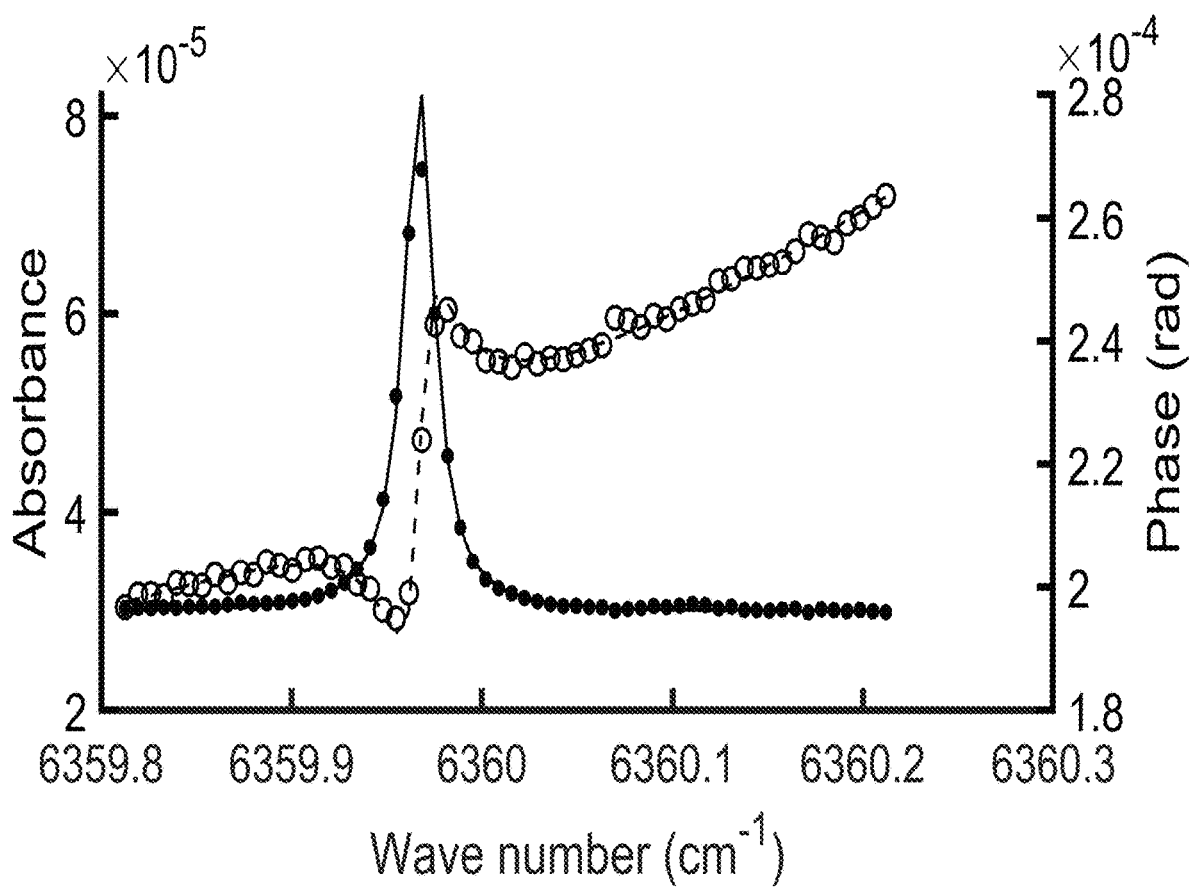
FIG. 8 shows a graph of absorbance versus wavenumber.

(which corresponds to a Lorentzian line shape at the point of maximum dispersion), $\tau_q=30$ µs, and various laser detuning frequencies $\delta\nu=\delta\omega/(2\pi)$. Here we used Eq. (2), assuming infinitely fast laser switching. Fitted values of $\delta\nu$ from CBDS and $\Gamma_q$ from CRDS were converted to equivalent absorption coefficient quantities, and the standard deviations of these values, $\sigma_\alpha$, were evaluated from the resulting distributions and treated as sensitivity parameters for each technique. In FIG. 7, the lines show the dependence of $\sigma_\alpha$ in both cases upon the width of the fitting time window, T. The lines are derived from analytical solutions for $\sigma_\alpha$ as a function of T which arise from an assumed least-squares fitting routine. To calculate the analytical solutions for CBDS, we again used Eq. (2) assuming infinitely fast laser switching and followed a procedure like CRDS.

CBDS has substantially improved sensitivity relative to CRDS as T decreases and $\delta\nu$ increases. Most interestingly, CBDS has an inherent sensitivity advantage for shorter measurement times, especially for fit windows where $T/\tau_q<1$. Notably, when $T/\tau_q=0.1$, CBDS provides a 30-fold reduction in $\sigma_\alpha$ relative to CRDS. Calculations not shown here also reveal that CBDS measurements are subject to substantially smaller biases than CRDS when $T/\tau_q<1$. For each chosen value of $\delta\nu$, the CBDS sensitivity advantage over CRDS is maximized once $T\delta\nu>1$. Further, the CBDS advantage over CRDS converges to a constant value, independent of $\delta\nu$, once $T\delta\nu>1$ for all $\delta\nu$. Generally, the advantage of CBDS disappears when T is shorter than the half-period of the beat frequency $1/(2\delta\nu)$. For long measurement times, when $T/\tau_q>>1$, the CBDS sensitivity converges to a value which larger than the CRDS sensitivity by a factor of 2. This apparent twofold disadvantage predicted for CBDS when $T/\tau_q>>1$ could be fully recovered in a two-point measurement scheme where, for CBDS, the chosen two points are at the extrema of the imaginary line shape profile. Finally, the vertical axis in graphs can be rescaled by the factor proportional to $(1-R)/L$ to further generalize these results for cavities of other lengths L and mirror reflectivities R. Therefore, the advantages of the CBDS can be also exploited in systems with compact cavities.

The above discussion assumed the realistic case in which optimized measurements of the light transmitted by the ring-down cavity are not limited by the available laser power. However, when noise in the buildup signal is laser-power-limited, then increases in $\delta\nu$ will lead to decreases in the SNR, because less radiation is coupled into the cavity mode.

Immunity of CBDS accuracy to detection system nonlinearity.

To quantify the effect of detection system nonlinearity on the accuracy of CBDS, we simulated buildup signals and assumed nonlinear quadratic or power-law deviations from linearity of the signal amplitude. Conventional CRDS absorption spectra also were analyzed in the same fashion. Given the same degree of assumed nonlinear response, the maximum relative errors in CBDS analyzed in the time-domain (TD) and frequency-domain (FD) were found to be independent of detuning $\delta\nu_{meas}$ and 6 and 50 times smaller, respectively than those acquired using CRDS. For the frequency-domain CBDS case, maximum errors were 0.02% for realistic non-linearities at the 2% level.

Figure 3:
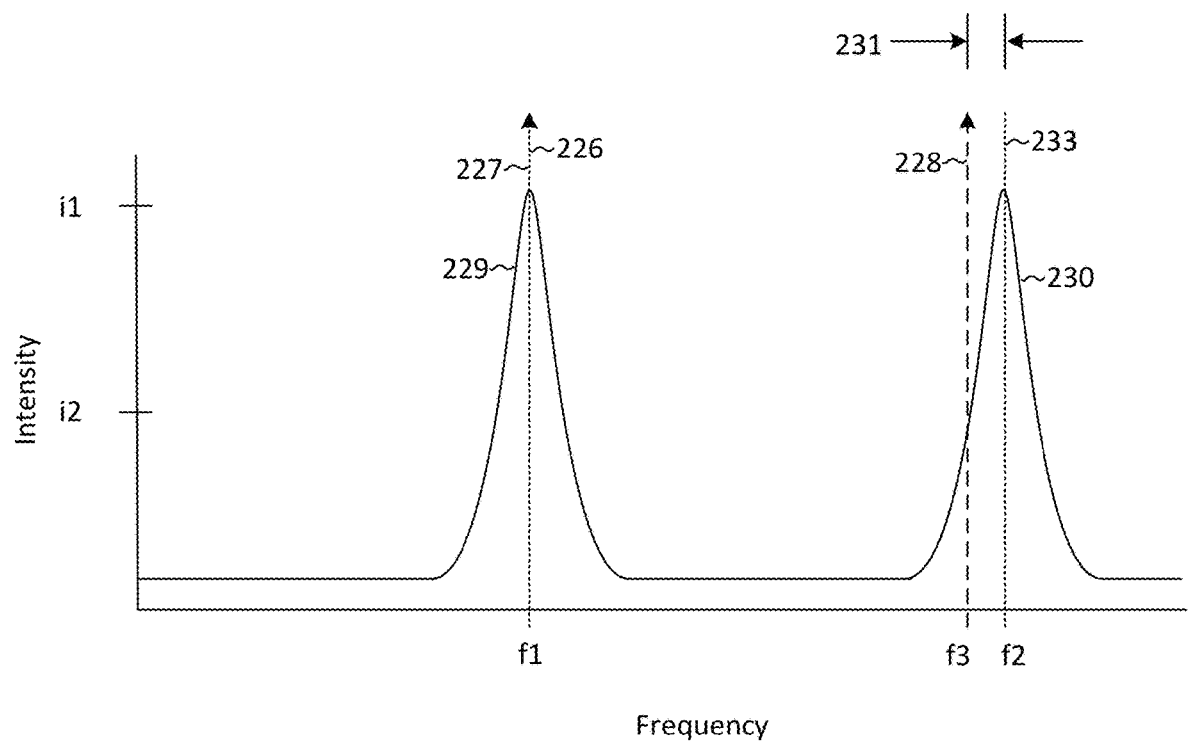
FIG. 3 shows a spectrum for cavity buildup dispersion spectrometry.

The CBDS method utilizes a single-frequency light source that is frequency-locked to the optical resonator. This is illustrated in FIG. 3 where primary frequency 227 of electromagnetic source 201 communicated to resonator 205 by coherent electromagnetic radiation 211 is frequency locked at frequency f1 to primary cavity mode 229 having primary resonance frequency 226. We use a double-polarization frequency-locked laser scheme where one linear polarization of laser light is frequency-locked to a cavity mode while the orthogonal polarization (having a well-controlled, constant frequency detuning $\nu_{MW}$ from the locking point) is used for non-resonant excitation of the measured cavity mode. Additionally, the cavity length is stabilized to prevent thermal drift of the comb of modes over time scales >1 s. Also shown in FIG. 3, the buildup signal is initiated after rapidly switching on using shutter 203 the frequency-detuned probe beam with secondary frequency 228 at frequency f3 communicated by frequency shifted radiation 214 to interact with secondary cavity mode 230 of secondary resonance frequency 233, and the locking beam remains on at frequency f1 during the entire cavity pumping process, but does not contribute to the CBDS signal because of a polarization-dependent optical filter discriminator 208 and the large frequency difference between probe and locking beams. Coherent averaging of repeated events in the time-domain is readily achieved because of the tight frequency-locking scheme. The Fourier spectrum of the beating signal appearing in the transmitted light allows determination of the frequency detuning $\delta v_{meas}$ of the cavity resonance with respect to the probe beam frequency $v_p$. The relation $k\delta v_{FSR}-(v_{MW}+\delta v_{meas})$ yields the dispersive shift $\delta v_D$ of the cavity resonance relative to the locking point frequency $v_L$. Here, $\delta v_{FSR}$ is the FSR corresponding to cavity conditions outside the molecular resonance with potential contribution from the broadband intracavity dispersion, and k is the integer number of modes between the locking point and the measured cavity mode.

Frequency detuning and intracavity gas sample.

Frequency agile rapid scanning for fast spectral acquisition was achieved by adjusting the detuning frequency $v_{MW}$ using a high-bandwidth (~20 GHz) electro-optic modulator. We ensure that only a single sideband of $EOM_P$ excites the cavity mode and all other sidebands as well as the carrier are fully reflected from the cavity. Using a macroscopic-length (0.75 m) resonator containing a sample of carbon dioxide ($CO_2$) in air and tuning our laser frequency to the probe the peak absorption, we observe signals comprising a complex valued molecular spectrum.

Molecular spectra retrieval.

For each cavity resonance, a buildup signal was recorded at a new value of $v_{MW}$. Corresponding fits of the buildup model to the time-domain detector signal 220 at each frequency step show absorptive and dispersive changes in the width and position of cavity modes within the frequency range of the measured molecular line. Measured dispersive shifts $\delta v_D(v-v_0)$, determined for each cavity mode, were used to reconstruct the purely frequency-based complex-valued (absorption and dispersion) line shape of a $CO_2$ transition. The absorption was calculated from the measured dispersion using a Voigt model of line shape $\mathcal{L}(\omega)$.

CBDS achieves high accuracy through precise measurement of the cavity resonance frequencies resulting from accurate modeling and fitting of the buildup signals in the frequency domain. The generality of our field-based method enables applications to dynamic cavity-enhanced sensing throughout the electromagnetic spectrum, making the method amenable to the analysis of intermode (Example 1) and multiplexed buildup signals with detuned local excitation fields. The tightly frequency-locked optical scheme allows for coherent time-domain averaging of CBDS signals, and therefore ultrahigh precision with minimal data storage. We see CBDS for improving the accuracy of fundamental and atmospheric absorption spectroscopy studies as well as metrological applications which to date have depended exclusively on intensity-based experiments. The rapidity and sensitivity of CBDS should also render it useful in fast biological processes and single-particle spectroscopy. Moreover, CBDS methods are expected to be readily extendable to broadband spectroscopic techniques using an optical frequency comb, which could open new possibilities for high-accuracy measurements in this field. In classical dual-comb spectroscopy, information about the absorptive and dispersive components of the sample spectrum is encoded in the amplitude and phase shift of the detected beat notes, respectively, whereas in CBDS this information would be encoded directly in the measured mode widths and mode frequencies.

The digital nature and resulting noise immunity of frequency measurements provides properties making frequency the quantity in nature that can be determined with the highest precision and accuracy. Given this perspective, the CBDS technique also aligns well with general efforts to express physical quantities in terms of frequency. Atomic and molecular spectra entirely measured in terms of cavity resonance frequencies can be easily referenced to the atomic frequency standard. CBDS provides robust SI-referenced uncertainties and will greatly facilitate interlaboratory comparisons of data. In this context, CBDS can be used for to Doppler and ro-vibrational thermometry as well as to a new gas pressure standard currently being developed that are based on precisely measuring the dispersive shifts of optical cavity modes. Nondestructive detection of Rydberg atoms based on cavity dispersion and chemical kinetic study of may be performed by CBDS for speed and accuracy of determination of atomic and molecular populations.

In the context of saturation-free CRDS, the relation between absorption in the cavity medium and concomitant perturbations on the cavity mode frequencies can be derived so that the frequency-dependence of the real and imaginary parts of the index of refraction $n(\omega)=n_0+\chi(\omega)/(2n_0)$ of the absorbing cavity gas can be expressed in terms of the absorptive and dispersive components of the complex-valued resonant susceptibility $\omega(\omega)=\chi'(\omega)-i\chi''(\omega)$. The real and imaginary components of $\chi$ are tied by causality considerations that ensure zero impulse response for t<0. Absorption and dispersion are thus given by $$\alpha_q = \frac{\omega_q \chi''(\omega)}{cn_0}, \text{ and} \tag{5}$$

$$\Delta\omega_q = -\omega_q \frac{\chi'(\omega)}{2n_0^2}, \tag{6}$$

respectively. Here $\Delta\omega_q=\omega_q-\omega_q^{(0)}$ is the absorption-induced shift of the unperturbed mode position, $\omega_q^{(0)}$. The ratio of mode shift $\Delta\omega_q$ to absorption coefficient, $\alpha_q$ reduces to $$\frac{\Delta\omega_q}{\alpha_q} = -\frac{c}{2n_0}\frac{\chi'(\omega)}{\chi''(\omega)}, \tag{7}$$

where c is the speed of light and $n_0$ is non-resonant refractive index of the sample.

Substituting $\alpha_q=(1/c)(1/\tau_q-1/\tau_{q,0})$, with $\tau_{q,0}$ equal to the cavity time constant in the absence of absorption, and the uncertainty relation $2\Gamma_q\tau_q=1$ into Eq. (6) gives the ratio of the frequency shift to the increase in decay rate, $\Delta\Gamma_q=\Gamma_q-\Gamma_{q,0}$, as $$\frac{\Delta\omega_q}{\Delta\Gamma_q} = -\frac{\chi'(\omega)}{n_0\chi''(\omega)}. \tag{8}$$

For measurements of isolated line shapes, one can write the resonant susceptibility for a line located at $\omega_j$ as $$\chi(\omega) = -in_0\frac{c}{\omega}\mathcal{L}^*(\omega-\omega_j)n_a S_j, \tag{9}$$

Here * denotes complex conjugate, $S_j$ is the line intensity given by $2\pi c S_{\bar{v},j}$ in which $S_{\bar{v},j}$ is the intensity in standard dimensions of line area×wave number per molecule, $n_a$ is the number density of the absorber and $\mathcal{L}(\omega)$ is the complex-valued line profile function normalized so that $\int \mathcal{L}(\omega)d\omega=1$. Equation (8) can be rewritten using complex line shape function $\mathcal{L}(\omega)$ $$\frac{\delta \omega_D}{\Delta \Gamma_q} = \frac{\text{Im}\{\mathcal{L}(\omega_q - \omega_0)\}}{n_0 \text{Re}\{\mathcal{L}(\omega_q - \omega_0)\}}. \tag{10}$$

For symmetric line profiles $\text{Re}\{\mathcal{L}(\omega-\omega_j)\}$, $\text{Im}\{\mathcal{L}(\omega-\omega_j)\}$ is an odd function centered on $\omega_j$, such that $\Delta\omega_q>0$ for $\omega>\omega_j$ and $\Delta\omega_q<0$ for $\omega<\omega_j$. This means that ab sorption-induced dispersion tends to "push" local cavity modes away from their unperturbed positions. In practice, this result can be used to disambiguate the signs of measured heterodyne beat frequencies.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A cavity buildup dispersion spectrometer comprising:
    a shutter that receives coherent electromagnetic radiation, modulates the coherent electromagnetic radiation at a shutter frequency; and produces modulated electromagnetic radiation from the coherent electromagnetic radiation;
    a frequency shifter in communication with the shutter and that receives the modulated electromagnetic radiation from the shutter, frequency shifts the modulated electromagnetic radiation by a shifter frequency; and produces frequency shifted radiation that is different from the modulated electromagnetic radiation by the shifter frequency;
    a resonator in communication with the frequency shifter and comprising:
        a plurality of mirrors separated by a distance;
        an intracavity space interposed between the mirrors having the distance as a length; and
        a plurality of cavity modes comprising: a primary cavity mode at a primary resonance frequency; and a secondary cavity mode at a secondary resonance frequency, such that the resonator:
            receives the frequency shifted radiation from the frequency shifter;
            receives coherent electromagnetic radiation;
            produces cavity radiation, in the intracavity space, from the frequency shifted radiation and the coherent electromagnetic radiation;
            receives an analyte in the intracavity space;
            subjects the analyte to the cavity radiation
            transmits the cavity radiation as transmitted electromagnetic radiation; and
    a receiver in communication with the resonator and that:
        receives the transmitted electromagnetic radiation from the resonator; and
        produces detector signal from the transmitted electromagnetic radiation, such that the detector signal comprises a beat frequency that corresponds to a change in a motion of resonator that comprises a change in the distance between the mirrors or a change of refractive index of the analyte in the intracavity space.

2. The cavity buildup dispersion spectrometer of claim 1, further comprising a frequency locking loop in communication with the resonator and the second coherent electromagnetic source and that:
    receives second coherent radiation from the resonator;
    produces a coherent electromagnetic radiation from the second coherent radiation; and
    communicates the coherent electromagnetic radiation to the second coherent electromagnetic source.

3. The cavity buildup dispersion spectrometer of claim 2, wherein the resonator produces the second coherent radiation from the cavity radiation, and the resonator communicates the second coherent radiation to the frequency locking loop.

4. The cavity buildup dispersion spectrometer of claim 3, wherein the frequency locking loop comprises:
    a receiver in communication with the resonator and receives the second coherent radiation from the resonator and produces an electronic error signal from the second coherent radiation;
    a loop filter in communication with the receiver and that receives the electronic error signal from the receiver and produces a feedback control signal from the electronic error signal; and
    an electromagnetic source in communication with the loop filter and that: receives the feedback control signal from the loop filter, produces a coherent electromagnetic radiation from the feedback control signal, and communicates the coherent electromagnetic radiation to a second coherent electromagnetic source and the resonator.

5. The cavity buildup dispersion spectrometer of claim 4, further comprising the second coherent electromagnetic source in communication with the shutter and the electromagnetic source of the frequency locking loop and that:
  receives the coherent electromagnetic radiation from the electromagnetic source;
  produces the coherent electromagnetic radiation from the coherent electromagnetic radiation; and
  communicates the coherent electromagnetic radiation to the frequency locking loop.

6. The cavity buildup dispersion spectrometer of claim 5, wherein the resonator receives the coherent electromagnetic radiation from the electromagnetic source.

7. The cavity buildup dispersion spectrometer of claim 6, further comprising a discriminator in communication with the resonator and the receiver and that:
  receives the transmitted electromagnetic radiation from the resonator;
  produces discriminator signal from the transmitted electromagnetic radiation; and
  communicates the discriminator signal to the receiver, such that the receiver produces the detector signal from the discriminator signal.

8. The cavity buildup dispersion spectrometer of claim 1, further comprising an analyzer in communication with the receiver and that:
  receives the detector signal from the receiver; and
  produces analyzer signal from the detector signal.

9. A process for performing cavity buildup dispersion spectroscopy with a cavity buildup dispersion spectrometer, the process comprising:
  receiving, by a shutter, coherent electromagnetic radiation;
  modulating, by the shutter, the coherent electromagnetic radiation at a shutter frequency;
  producing, by the shutter, modulated electromagnetic radiation from the coherent electromagnetic radiation;
  receiving, by a frequency shifter, the modulated electromagnetic radiation from the shutter;
  frequency shifting, by the frequency shifter, the modulated electromagnetic radiation by a shifter frequency;
  producing, by the frequency shifter, frequency shifted radiation shifted by the shifter frequency from the modulated electromagnetic radiation;
  receiving, by a resonator, the frequency shifted radiation from the frequency shifter, the resonator comprising:
    a plurality of mirrors separated by a distance;
    an intracavity space interposed between the mirrors having the distance as a length; and
    a plurality of cavity modes comprising: a primary cavity mode at a primary resonance frequency; and a secondary cavity mode at a secondary resonance frequency, such that the resonator;
  receiving, by the resonator, coherent electromagnetic radiation;
  producing, by the resonator, cavity radiation, in the intracavity space, from the frequency shifted radiation and the coherent electromagnetic radiation;
  receiving, by the resonator, an analyte in the intracavity space;
  subjecting the analyte to the cavity radiation;
  transmitting the cavity radiation as transmitted electromagnetic radiation from the resonator;
  receiving, by a receiver, the transmitted electromagnetic radiation from the resonator; and
  producing, by the receiver, a detector signal from the transmitted electromagnetic radiation to perform cavity buildup dispersion spectroscopy,
wherein the detector signal comprises a beat frequency that corresponds to a change in a motion of resonator that comprises a change in the distance between the mirrors or a change of refractive index of the analyte in the intracavity space.

10. The process of claim 9, further comprising:
receiving, by a frequency locking loop, the second coherent radiation from the resonator;
producing, by the frequency locking loop, a coherent electromagnetic radiation from the second coherent radiation; and
communicating the coherent electromagnetic radiation to the second coherent electromagnetic source from the frequency locking loop.

11. The process of claim 10, further comprising:
producing, by the resonator, the second coherent radiation from the cavity radiation; and
communicating, by the resonator, the second coherent radiation to the frequency locking loop.

12. The process of claim 11, further comprising:
receiving, by a receiver of the frequency locking loop, the second coherent radiation from the resonator;
producing, by the receiver, an electronic error signal from the second coherent radiation;
receiving, by a loop filter of the frequency locking loop, the electronic error signal from the receiver;
producing, by the loop filter of the frequency locking loop, a feedback control signal from the electronic error signal;
receiving, by an electromagnetic source, the feedback control signal from the loop filter;
producing, by the electromagnetic source, a coherent electromagnetic radiation from the feedback control signal; and
communicating the coherent electromagnetic radiation to a second coherent electromagnetic source and the resonator from the electromagnetic source.

13. The process of claim 12, further comprising:
receiving, by the second coherent electromagnetic source, the coherent electromagnetic radiation from the electromagnetic source;
producing, by the second coherent electromagnetic source, the coherent electromagnetic radiation from the coherent electromagnetic radiation; and
communicating the coherent electromagnetic radiation to the frequency locking loop from the second coherent electromagnetic source.

14. The process of claim 13, further comprising, receiving, by the resonator, the coherent electromagnetic radiation from the electromagnetic source.

15. The process of claim 14, further comprising:
receiving, by a discriminator, the transmitted electromagnetic radiation from the resonator;
producing, by the discriminator, the discriminator signal from the transmitted electromagnetic radiation;
communicating the discriminator signal to the receiver from the discriminator; and
producing, by the receiver, the detector signal from the discriminator signal.

16. The process of claim 9, further comprising:
receiving, by an analyzer, the detector signal from the receiver; and
producing, by the analyzer, an analyzer signal from the detector signal.

* * * * *